United States Patent
Greenberger et al.

(10) Patent No.: US 11,164,241 B2
(45) Date of Patent: Nov. 2, 2021

(54) COMPARTMENT RENTAL IN AN AUTONOMOUS RIDE SOURCE AND DELIVERY ROAD VEHICLE

(71) Applicant: International Business Machines Corporation, Armonk, NY (US)

(72) Inventors: Jeremy A. Greenberger, San Jose, CA (US); James R. Kozloski, New Fairfield, CT (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 15/840,845

(22) Filed: Dec. 13, 2017

(65) Prior Publication Data
US 2019/0180354 A1     Jun. 13, 2019

(51) Int. Cl.
| | |
|---|---|
| *G06Q 30/06* | (2012.01) |
| *G05D 1/00* | (2006.01) |
| *G05D 1/02* | (2020.01) |
| *G06Q 20/10* | (2012.01) |
| *G06Q 20/40* | (2012.01) |
| *G06Q 10/10* | (2012.01) |
| *G06F 3/048* | (2013.01) |
| *G06Q 10/04* | (2012.01) |
| *G06Q 30/02* | (2012.01) |

(52) U.S. Cl.
CPC ....... *G06Q 30/0645* (2013.01); *G05D 1/0088* (2013.01); *G05D 1/0291* (2013.01); *G06Q 10/109* (2013.01); *G06Q 20/10* (2013.01); *G06Q 20/401* (2013.01); *G06F 3/048* (2013.01); *G06Q 10/04* (2013.01); *G06Q 30/0284* (2013.01)

(58) Field of Classification Search
CPC ........ G06Q 40/00; G06Q 40/02; G06Q 20/40; G06Q 20/10; G06Q 20/04
USPC .......................................................... 705/44
See application file for complete search history.

(56) References Cited

U.S. PATENT DOCUMENTS

| | | |
|---|---|---|
| 8,786,437 B2 | 7/2014 | Breed |
| 9,256,852 B1 | 2/2016 | Myllymaki |
| 9,336,506 B2 | 5/2016 | Shucker et al. |

(Continued)

OTHER PUBLICATIONS

Zhang (Rick Zhang, "Models, Algorithms, and Evaluation for Autonomous Mobility-On-Demand Systems", Jul. 1, 2015, 2015 American Control Conference (ACC) (pp. 2573-2587)).*

(Continued)

*Primary Examiner* — Gregory A Pollock
(74) *Attorney, Agent, or Firm* — ZIP Group PLLC

(57) ABSTRACT

An autonomous road vehicle is operative to receive ride source requests, product delivery requests, and ancillary product purchase and fulfillment requests. A product securing subsystem is attached to the autonomous road vehicle and comprises at least one securable compartment. Each securable compartment is operative to secure at least one product therein. Each securable compartment is associated with compartment access information. An access subsystem comprising at least one access information interface. The access subsystem is operative, upon receipt through the access information interface of compartment access information, to permit access to the compartment in order to enable product purchase and fulfillment requests.

6 Claims, 12 Drawing Sheets

(56) References Cited

U.S. PATENT DOCUMENTS

| | | | |
|---|---|---|---|
| 9,373,149 B2 | 6/2016 | Abhyanker | |
| 9,459,622 B2 | 10/2016 | Abhyanker | |
| 9,552,564 B1 | 1/2017 | Martenis | |
| 10,019,743 B1 | 7/2018 | Finch et al. | |
| 10,233,021 B1* | 3/2019 | Brady | G01C 21/3407 |
| 2015/0006005 A1* | 1/2015 | Yu | G06Q 10/08 |
| | | | 701/22 |
| 2015/0339928 A1 | 11/2015 | Ramanujam | |
| 2016/0132214 A1 | 5/2016 | Koushik et al. | |
| 2016/0364678 A1 | 12/2016 | Cao | |
| 2016/0364679 A1* | 12/2016 | Cao | G06Q 10/083 |
| 2019/0072400 A1 | 3/2019 | Chamberlain et al. | |

OTHER PUBLICATIONS

List of IBM Patents or Patent Applications Treated as Related, dated herewith.

Foldes et al., "Model of Information System for Combined Ride-Sourcing Service," Smart Cities Symposium Prague 2017.

* cited by examiner

COMPARTMENT RENTAL IN AN AUTONOMOUS RIDE SOURCE AND DELIVERY ROAD VEHICLE

BACKGROUND

Embodiments presented herein are related to electronic devices, and more specifically, to an autonomous road vehicle that may both provide rides for people and deliver products, goods, or packages.

An autonomous vehicle (also known as a driverless vehicle, self-driving vehicle, robotic vehicle, or the like) is a vehicle that is capable of sensing its environment and navigating without human input. Autonomous vehicles use a variety of techniques to detect their surroundings, such as radar, laser light, global positioning system (GPS), odometry and computer vision. Advanced control systems interpret sensory information to identify appropriate road navigation paths, as well as obstacles and relevant road signage. Autonomous vehicles must have control systems that are capable of analyzing sensory data to distinguish between different cars on a road.

The potential benefits of autonomous vehicles include reduced mobility and infrastructure costs, increased safety, increased mobility, and increased customer satisfaction. Specifically a significant reduction in traffic collisions; the resulting injuries; and related costs, including less need for insurance. Autonomous vehicles are predicted to increase traffic flow; provided enhanced mobility; relieve travelers from driving and navigation chores; lower fuel consumption; significantly reduce needs for parking space and facilitate business models for transportation as a service, especially via the sharing economy.

Delivery services (also known as courier services, mail services, and shipping services), such as those offered by the U.S. Postal Service and commercial carriers provide delivery and pickup of letters, packages, and parcels (hereinafter referred to as "packages") to and from residences and businesses across the country. Typically, such services operate in hub and spoke architecture.

A typical nationwide or international delivery service maintains a large fleet of vehicles. Such vehicles include airplanes and semi-trailer trucks to move packages between hubs and spokes, and smaller vehicles for the "last mile" from spoke endpoints to delivery destinations (for example a home or business). Between them, the two largest commercial delivery services in the U.S. operate over 100,000 last mile vehicles—each of which requires a human operator. In some situations, some interaction with a person at pickup or delivery is desired, for example for proof of delivery, for payment on delivery (also known as "cash on delivery" or "COD"), or payment of delivery costs on pickup. The growth of business-to-consumer e-commerce, online shopping for example, is expected to continue to increase the demand for delivery services, and hence the need for capacity and efficiency in the last mile.

Ride sourcing, also known as ridesharing, dynamic ridesharing, ad-hoc ridesharing, on-demand ridesharing, and dynamic carpooling, is a service that arranges human passenger rides or human transportation on a short notice or prescheduled basis by a human driver in a traditional vehicle. This type of carpooling generally makes use of three recent technological advances: GPS navigation devices to determine a driver's route and arrange the ride, smartphones for a traveler to request a ride from wherever they happen to be, and social networks to establish trust and accountability between drivers and passengers. These elements are coordinated through a ride sourcing network service, which can instantaneously handle passenger payments, routes, and matching available drivers and passengers using optimization algorithms.

Ride sourcing is promoted as a way to better utilize the empty seats in most traditional passenger vehicles, thus lowering fuel usage and transport costs. Ride sourcing can serve areas not covered by a public transit system and act as a transit feeder service. Ride sourcing is capable of serving one-time trips, not only recurrent commute trips or pre-scheduled trips.

SUMMARY

In an embodiment of the invention, a method is presented. The method includes receiving, with an autonomous road vehicle (ARV), an ARV compartment rental request from a seller. The rental request includes a requested arrival time of the ARV to a product fulfillment location. The method includes determining if an ARV compartment is scheduled to be unoccupied (available compartment) at the requested arrival time of the ARV. The method includes receiving the product within the available compartment of the ARV and subsequently securing the compartment. The method includes receiving product information of the product. The method includes subsequently providing a graphic user interface (GUI) upon a display of an infotainment system associated with the person station of the ARV. The GUI includes the product information. The method includes receiving a purchase confirmation of the product from a ride source person (buyer) being given a ride by the ARV. The method includes allowing access to the secured compartment and determining a rental time period the product was contained within the secured compartment.

In yet another embodiment of the present invention, a method is presented. The method includes receiving, with an autonomous road vehicle (ARV) fleet manager server (server), an ARV compartment rental request from a mobile device. The compartment rental request includes a requested arrival time of an ARV to a requested location. The method includes adding, with the server, the ARV compartment rental request to a request pool. The method includes determining, with an ARV, whether a compartment of the ARV is scheduled to be unoccupied (available compartment) at the requested arrival time of the ARV at the requested location. The method includes receiving a product within the available compartment of the ARV from a seller at the requested location and subsequently securing the compartment. The method includes receiving product information of the product. The method includes receiving, with the server, a subsequent ride source request for an ARV to provide a ride to a person. The method includes providing a graphic user interface (GUI) upon a display of an infotainment system associated with a person station of the ARV that includes the person during the ARV ride associated with the subsequent ride source request. The GUI includes the product information. The method includes receiving a purchase confirmation of the product from the person (buyer) during the ARV ride associated with the subsequent ride source request. The method includes allowing, with the ARV, the buyer access to the secured compartment and determining a time period the product was contained within the secured compartment.

In yet another embodiment of the present invention, a method is presented. The method includes receiving, with an autonomous road vehicle (ARV) fleet manager server (server), an ARV compartment rental request from a mobile device of a renter. The compartment rental request includes a first requested arrival time of an ARV to a first requested location. The method includes adding, with the server, the ARV compartment rental request to a request pool. The method includes determining, with an ARV, whether a compartment of the ARV is scheduled to be unoccupied (available compartment) at the requested arrival time of the ARV at the requested location. The method includes receiving a product within the available compartment of the ARV from the renter at the requested location and subsequently securing the compartment. The method includes receiving, with the server, an authorization by the renter to allow an authorized person to access the secured compartment and remove the product. The method includes receiving, with the server, a subsequent ride source request for the ARV to provide a ride source task to a person or a subsequent product delivery request for the ARV to provide a subsequent product delivery task. The method includes receiving, with the server, an ARV compartment retrieval request from a mobile device of the authorized person. The compartment retrieval request comprising a second requested arrival time of the ARV to a second requested location. The method includes allowing the authorized person access to the secured compartment to remove the product and determining a time period the product was contained within the secured compartment.

DETAILED DESCRIPTION

Embodiments presented herein disclose techniques for managing tasks of autonomous road vehicles that transport human passengers (persons) and deliver products and disclose techniques to provide ancillary services with the autonomous road vehicles.

Figure 1:
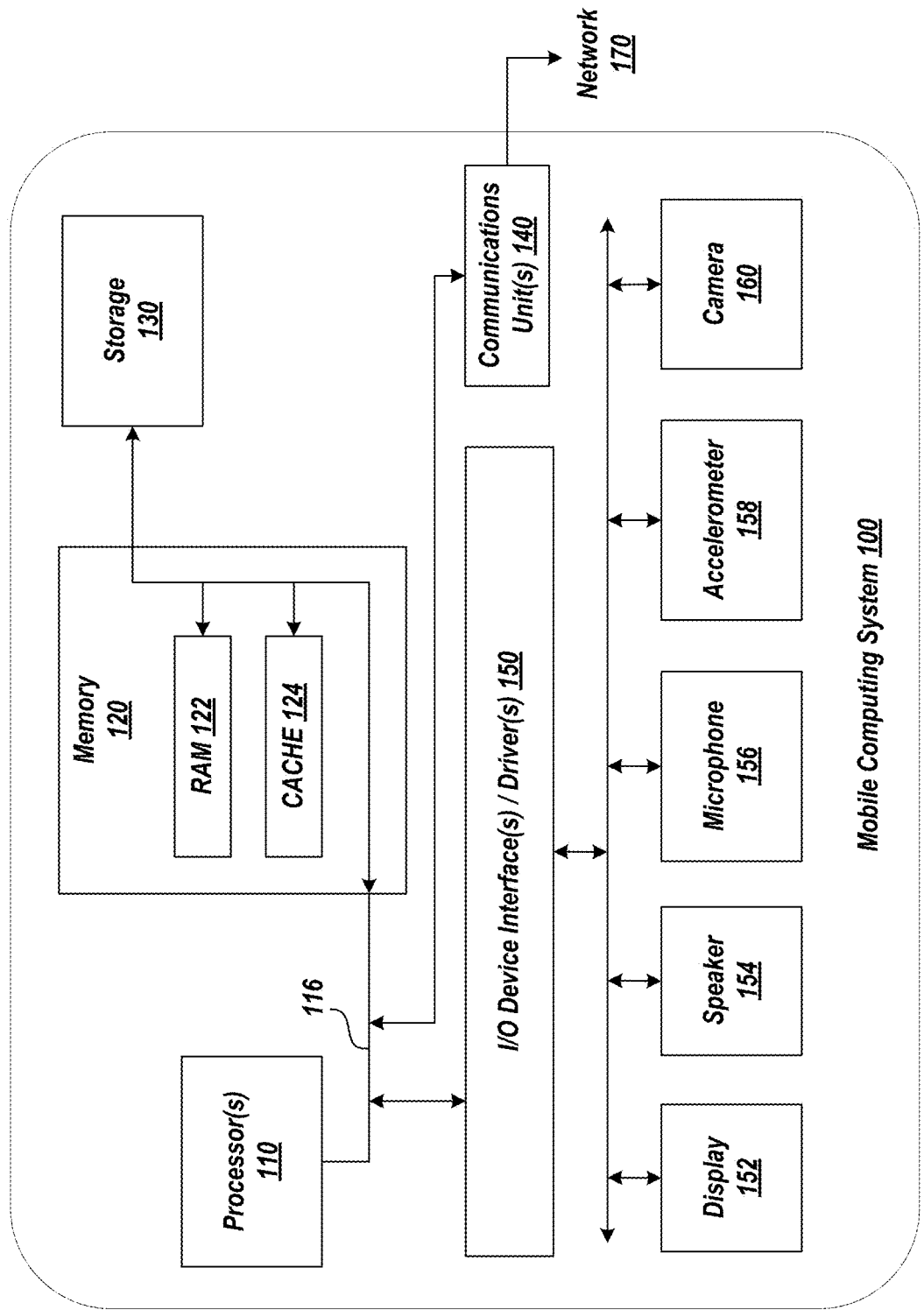
FIG. 1 illustrates an exemplary mobile computing system, according to one or more embodiments.

FIG. 1 illustrates an exemplary mobile computing system 100. Many modifications to the depicted features of the exemplary mobile computing system 100 may be made within the scope of the invention.

Mobile computing system 100 is a handheld portable electronic device and may include a bus 116, which provides communications between at least processor(s) 110, memory 120, persistent storage 130, communications unit 140, and input/output (I/O) interface(s)/driver(s) 150. Memory 120 and persistent storage 130 are examples of a computer readable storage device. A storage device is any piece of hardware that is capable of storing information, such as, data, program code in functional form, and/or other suitable information on a temporary basis and/or permanent basis. Memory 120 may be, for example, one or more random access memories (RAM) 122, cache memory 124, or any other suitable non-volatile or volatile storage device.

An application and/or operating system is stored within storage 130 and/or memory 120, for execution by one or more of the respective processors 110, and each may include a GUI that is visually presented by display 152. In the embodiment illustrated in FIG. 1, persistent storage 130 can include one or more of flash memory, magnetic disk storage device of an internal hard drive, a solid state drive, a semiconductor storage device, read-only memory (ROM), EPROM, or any other computer-readable storage device that is capable of storing program instructions or digital information.

The storage media used by persistent storage 130 may also be removable. For example, a removable hard drive may be used for persistent storage 130. Other examples include an optical or magnetic disk that is inserted into a drive for transfer onto another storage device that is also a part of persistent storage 130, or other removable storage devices such as a thumb drive or smart card.

Communications unit(s) 140 provides for communications with other data processing systems or devices. Communications unit(s) 140 may include one or more network interface circuits or cards and may provide communications through the use of either or both physical and wireless communications links. In other embodiments, mobile computing system 100 may be devoid of communications unit 410. An application may be downloaded to persistent storage 130 through communications unit(s) 140.

I/O device interface(s)/driver(s) 150 allows for input and output of data with other components within mobile computing system 100. For example, I/O device interface(s)/driver(s) 150 may provide a connection to display 152, a speaker 154, microphone 156, accelerometer 158, camera 160, and/or some other suitable input/output device. Display 152 provides a mechanism, such as a screen, to display the GUI to a user and may be, for example, a touch screen, or the like.

Figure 2:
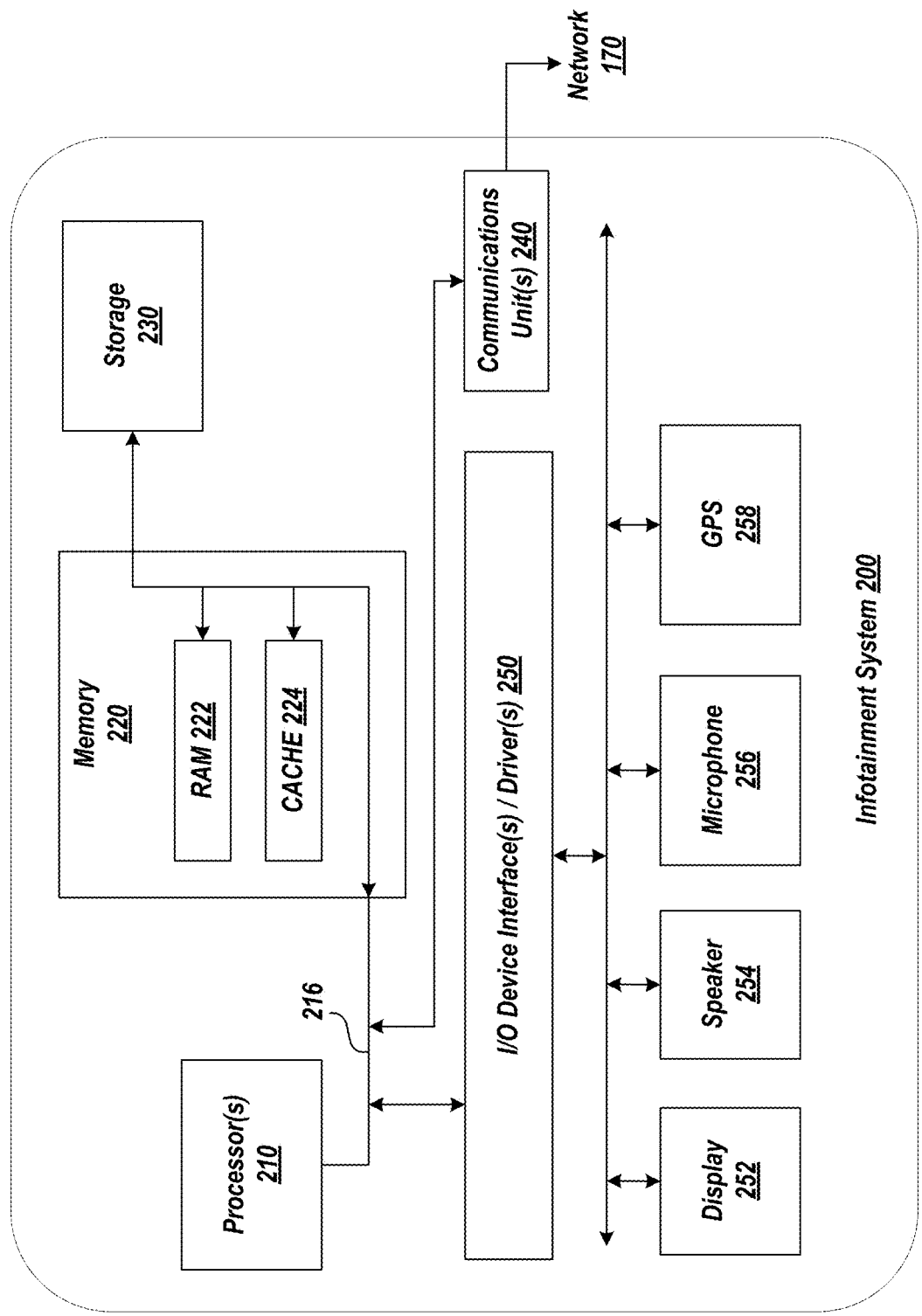
FIG. 2 illustrates an exemplary infotainment system, according to one or more embodiments.

FIG. 2 illustrates an exemplary infotainment system 200. Infotainment system 200 may also be referred to as a carputer since system 200 is a computer that include specializations to run in a car or other road vehicle.

Infotainment system 200 may include a bus 216, which provides communications between at least processor(s) 210, memory 220, persistent storage 230, communications unit 240, and input/output (I/O) interface(s)/driver(s) 250. Memory 220 and persistent storage 230 are further examples of computer readable storage devices. Memory 220 may be, for example, one or more random access memories (RAM) 222, cache memory 224, or any other suitable non-volatile or volatile storage device.

An application and/or operating system is stored within storage 230 and/or memory 220, for execution by one or more of the respective processors 210, and each may include a GUI that is visually presented by display 252. In the embodiment illustrated in FIG. 2, persistent storage 230 can include one or more of flash memory, magnetic disk storage device of an internal hard drive, a solid state drive, a semiconductor storage device, read-only memory (ROM), EPROM, or any other computer-readable storage device that is capable of storing program instructions or digital information.

Communications unit(s) 240 provides for communications with other data processing systems or devices. Communications unit(s) 240 may include one or more network interface circuits or cards and may provide communications through the use of either or both physical and wireless communications links. In other embodiments, system 200 may be devoid of communications unit 410. An application may be downloaded to persistent storage 230 through communications unit(s) 240.

I/O device interface(s)/driver(s) 250 allows for input and output of data with other components within infotainment system 200. For example, I/O device interface(s)/driver(s) 250 may provide a connection to display 252, a speaker 254, microphone 256, GPS system 258, and/or some other suitable input/output device. Display 252 provides a mechanism, such as a screen, to display the GUI to a user and may be, for example, a touch screen, or the like.

Figure 3:
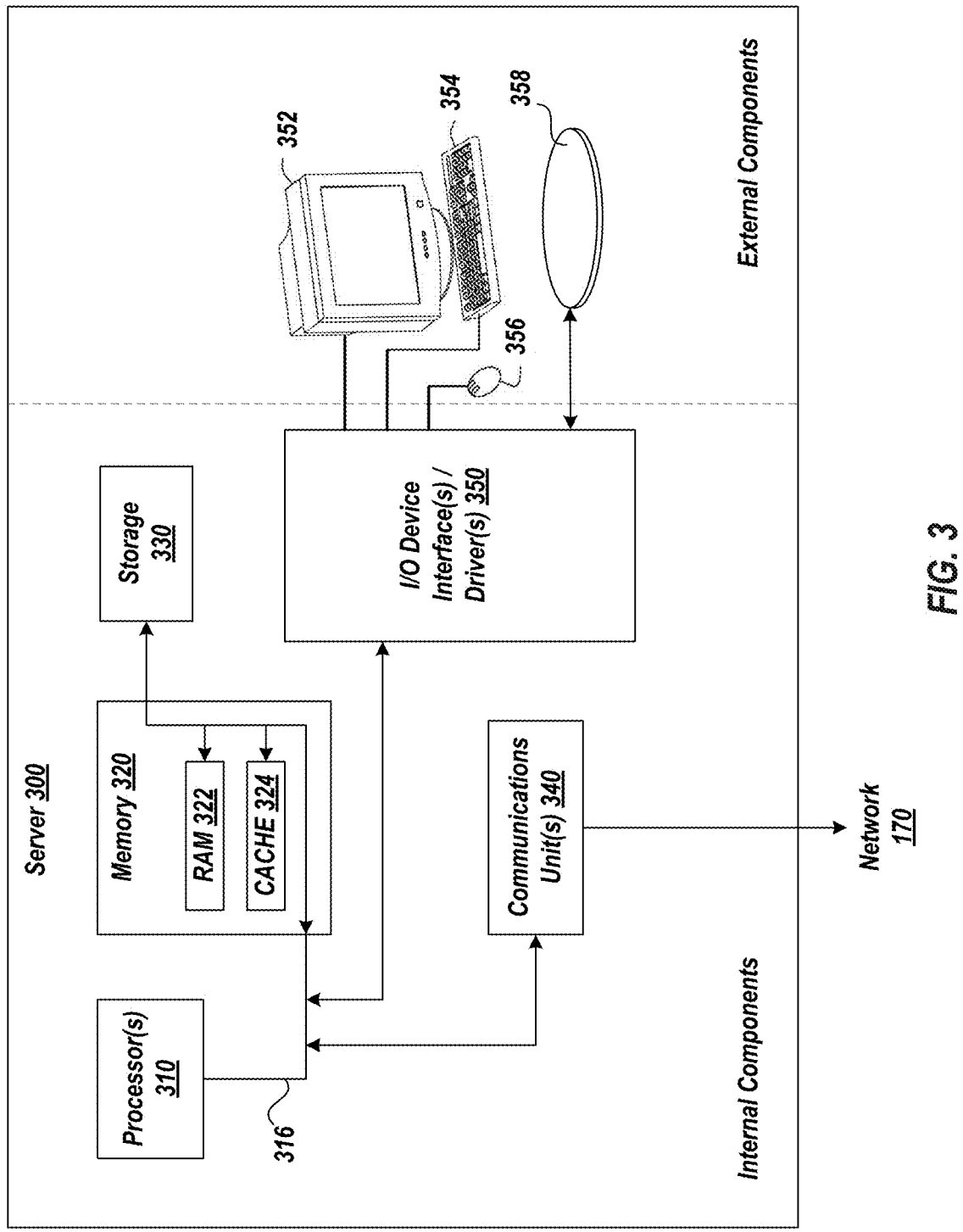
FIG. 3 illustrates an exemplary server, according to one or more embodiments.

FIG. 3 illustrates an exemplary server computing system 300. Server system 300 may include respective sets of internal components and external components. Each of the sets of internal components includes bus 316, which provides communications between at least processor(s) 310, memory 320, persistent storage 330, communications unit(s) 340, and input/output (I/O) interface(s)/driver(s) 350. Memory 320 and persistent storage 330 are further examples of computer readable storage devices. Memory 320 may be, for example, one or more random access memories (RAM) 322, cache memory 324, or any other suitable non-volatile or volatile storage device.

Persistent storage 330 can include one or more of flash memory, magnetic disk storage device of an internal hard drive, a solid state drive, a semiconductor storage device, read-only memory (ROM), EPROM, or any other computer-readable storage device that is capable of storing program instructions or digital information. Communications unit(s) 340 provides for communications with other data processing systems or devices. Communications unit(s) 340 may include one or more network interface circuits or cards and may provide communications through the use of either or both physical and wireless communications links.

I/O device interface(s)/driver(s) 350 allows for input and output of data with other external components connected to application developer computing system 300. For example, I/O device interface(s)/driver(s) 350 may provide a connection to an external display 352, an external keyboard 354, an external mouse 356, an external storage media 358, and/or some other suitable input/output device. In some embodiments, speechability service computing system 300 may take the form of a non-user type electronic system, such as a server computer, and may therefore be devoid of external display 352, external keyboard 354, external mouse 356, and the like.

Referring to FIG. 1-FIG. 3, the term "system," "computer," "electronic device", or the like is used herein for convenience only, and in various embodiments is a more general appropriate data handling system, such as a mobile phone, tablet, server computer, wearable device, etc. In a particular embodiment, computing system 100 is a smart phone, infotainment system 200 is an in-vehicle computer, and server system 300 is a host computer such as a server.

In some embodiments, there may be multiple computers that collectively make up system 200. Likewise, in particular embodiments, there may be multiple computers that collectively make up server system 300. In these embodiments, each similar computer is connected to at least one other similar computer via one or more networks, generically referred herein as network 170.

Each of the computing systems of the embodiments contains one or more general-purpose programmable processor. In some computing systems, the computing system contains multiple processors typical of a relatively large system such as a server computer. Each processor executes instructions stored in the memory and may comprise one or more levels of on-board cache.

The RAM 122, 222, and/or 322 may store or encode data and programs. In an embodiment, the memory 120, 220, and/or 320 represents the entire virtual memory of the applicable computing system, and may also include the virtual memory of other similar type computing systems coupled thereto via the network 170. The memory 120, 220, and/or 320 may be conceptually a single monolithic entity, but in other embodiments the memory 120, 220, and/or 320 is a more complex arrangement, such as a hierarchy of caches and other memory devices. For example, memory 120, 220, and/or 320 may exist in multiple levels of caches, and these caches may be further divided by function, so that one cache holds instructions while another holds non-instruction data, which are read or otherwise operated upon by the appropriate processor 110, 210, or 310. Memory 120, 220, and/or 320 may be further distributed and associated with different similarly functioning appropriate processors 110, 210, or 310 or sets of appropriate processors 110, 210, or 310, as is known in any of various so-called non-uniform memory access (NUMA) computer architectures.

Memory 120, 220, and/or 320 stores or encodes an operating system and one or more applications. Although the operating system and applications may be viewed as being contained within the appropriate memory 120, 220, and/or 320, in other embodiments some or all of them may be on a different but similarly functioning computer system and may be accessed remotely, e.g., via the network 170. The computing system 100, 200, and/or 300 may use virtual addressing mechanisms that allow the programs of the computer 100 to behave as if they have access to a large, single storage entity instead of access to multiple, smaller storage entities. Thus, operating system and applications may not be completely contained in the same storage device at the same time. In an embodiment, the operating system and applications each comprise instructions or statements that execute on the one or more processors 110, 210, or 310 and/or instructions or statements that are called by the instructions or statements that execute on the one or more processors 110, 210, or 310 to carry out the functionality described below. When such program instructions are able to be run by the one or more processors 110, 210, or 310, such computing system becomes a particular machine configured to carry out such instructions.

Processors 110, 210, and/or 310 may function as a general-purpose programmable graphics processor unit (GPU) that builds images (e.g. a GUI) for output to a display. The GPU, working in conjunction with one or more applications, determines how to manipulate pixels of display, such as touch screen, to create a display image or user interface.

Ultimately, the image (e.g. GUI, etc.) is displayed to a user via the display. The processors 110, 210, and/or 310 and GPU may be discrete components interconnected by one or more busses or may be integrated into a single component.

Although the bus 116, 216, 316 is shown as a relatively simple, single bus structure providing a direct communication path among the processors, memory, and the I/O device interface/driver, in fact the bus 116, 216, and/or 316 may comprise multiple different buses or communication paths, which may be arranged in any of various forms, such as point-to-point links in hierarchical, star or web configurations, multiple hierarchical buses, parallel and redundant paths, or any other appropriate type of configuration.

Communication unit(s) 140, 240, and/or 340 may contain electronic components and logic to adapt or convert data of one protocol to another protocol. Therefore, communication unit(s) 140, 240, and/or 340 may connect a wide variety of devices or other computers to the appropriate system 100, 200, and/or 300, such as, but not limited to, servers, computers, bus adapters, PCI adapters, PCIe adapters, NVLink adapters, interfaces, using one or more protocols including, but not limited to, Token Ring, Gigabit Ethernet, Ethernet, Fibre Channel, SSA, Fibre Channel Arbitrated Loop (FCAL), Serial SCSI, Ultra3 SCSI, Infiniband, FDDI, ATM, 1394, ESCON, wireless relays, Twinax, LAN connections, WAN connections, high performance graphics connections, Bluetooth, etc.

The network 170 may be any suitable network or combination of networks and may support any appropriate protocol suitable for communication of data and/or code to/from the various systems. In various embodiments, the network 170 may represent a data handling device or a combination of data handling devices, either connected directly or indirectly to the systems. For example, system 100 and/or 200 may receive data from system 300 by the network 170. For clarity, though "network 170" is referred to, any number of networks (of the same or different types) may be present.

In another embodiment, the network 170 may support wireless communications. In another embodiment, the network 170 may support hard-wired communications, such as a telephone line or cable. In another embodiment, the network 170 may be the Internet and may support IP (Internet Protocol). In another embodiment, the network 170 is implemented as a local area network (LAN) or a wide area network (WAN). In another embodiment, the network 170 is implemented as a hotspot service provider network. In another embodiment, the network 170 is implemented as any appropriate cellular data network, cell-based radio network technology, or wireless network. In another embodiment, the network 170 is implemented as any suitable network or combination of networks.

FIG. 1-FIG. 3 are intended to depict the representative major components of the applicable system. The individual components may have greater complexity than represented in the figures, components other than or in addition to those shown the figures may be present, and the number, type, and configuration of such components may vary.

Figure 4:
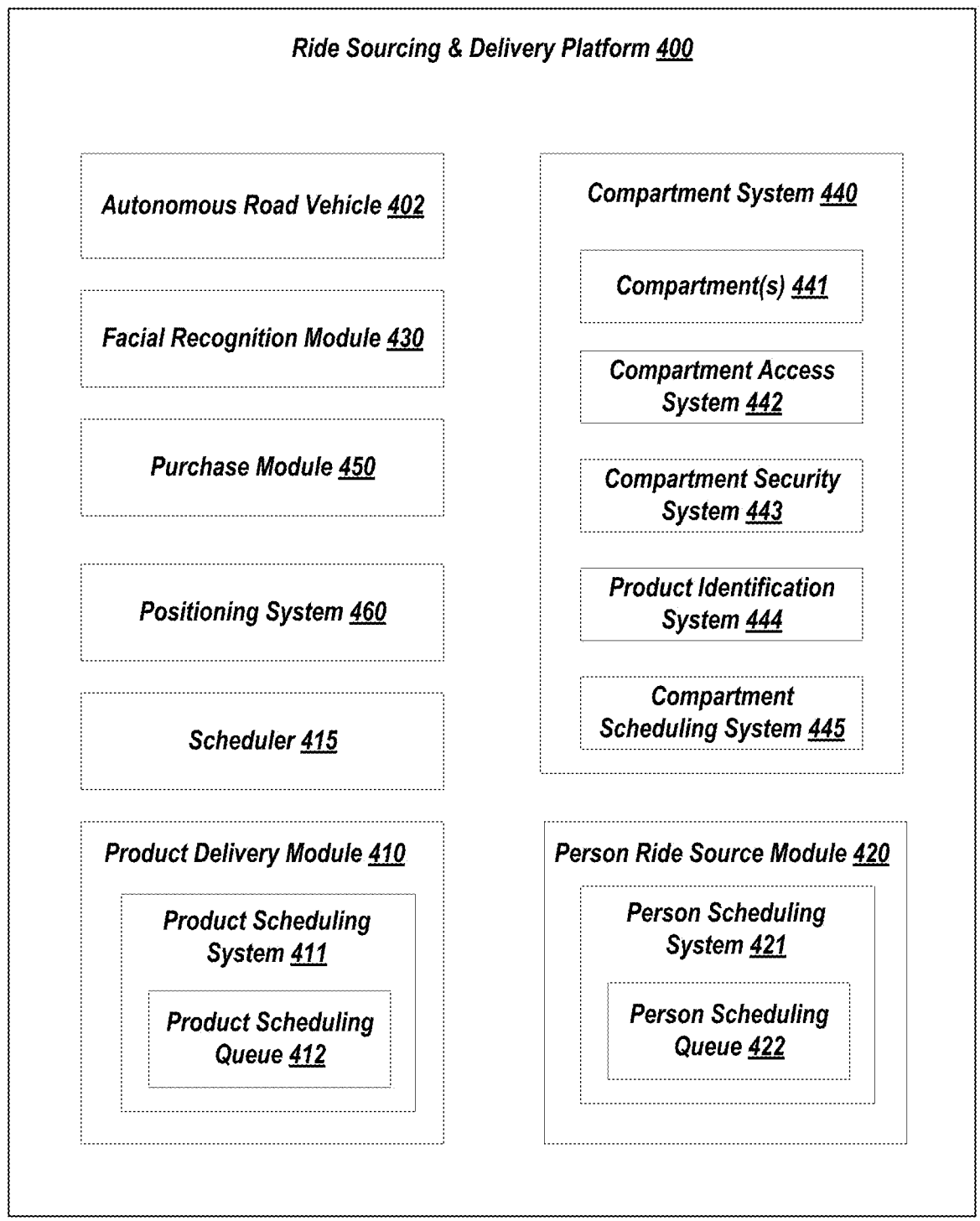
FIG. 4 illustrates an exemplary autonomous road vehicle ride sourcing and delivery platform, according to one or more embodiments.

FIG. 4 illustrates an exemplary autonomous road vehicle (ARV) ride sourcing and delivery platform 400, according to one or more embodiments. ARV ride sourcing and delivery platform 400 includes an ARV 402, a product delivery module 410, and a person ride source module 420.

ARV 402 is a road vehicle that is capable of sensing its environment and navigating without human input. ARV 402 utilizes a variety of techniques to detect surroundings, such as radar, laser light, GPS, odometry, computer vision, or the like. Advanced control systems interpret sensory information to identify appropriate road navigation paths, as well as obstacles and relevant road signage. ARV 402 utilizes control systems that are capable of analyzing sensory data to distinguish between different vehicles on the shared road. Some ARVs have completed over 300,000 miles of testing over a wide range of traffic conditions without a single accident under autonomous operation. ARVs can use various sensors, for example, video cameras, radar sensors and laser range finders, to "see" other traffic, as well as detailed maps to navigate a road, and a communication subsystem, such as a wireless communication subsystem, to communicate with a controller and other entities.

ARV 402 can be operative to receive origin location and/or destination location information, and to drive to one or more destinations based on such location information. Embodiments of a system of the technology, described elsewhere herein, can transmit the locations and an optimized route to the ARV 402 via the communication subsystem of the ARV 402. In some embodiments, the ARV 402 can determine the route.

ARV 402 is configured to transport both people and products and include one or more person stations (each person station include a seat, harness, and the like) and include one or more securable compartments capable of housing one or more products. ARV 402 can be what is known as a car, truck, or the like. Other types of road vehicles can be used in embodiments of the present technology, including but not limited to cargo vans, minivans, pickup trucks, panel vans, platform trucks, flatbed trucks, refrigerated trucks, tank trucks, and semi-trailer trucks, or the like. Internal combustion engines, electric engines, and hybrid systems can power such vehicles.

ARV 402 can receive person or product pickup and/or destination information for three exchange destinations, including a route from a current location to a pickup location, and then to a subsequent task location.

Product delivery module 410 is program instructions, an application, routine, or sub-routine that is stored upon a storage device and evoked by a processor to manage one ARV 402, within a fleet of ARVs, in delivering goods, letters, packages, parcels, or the like, collectively referred herein as products. Product delivery module 410 may establish a starting location, establish the route of the ARV 402 to pick up or otherwise accept a product at the starting location, and establish the route of the ARV 402 to from the starting location to an ending location for the delivery the product. Product delivery module 410 may include a product scheduling system 411 to receive and accumulate requests to accept and deliver products and/or a product queue 412 to store such requests to accept and deliver products. Such requests may generally be on demand requests, in that the requester requests ARV 402 product acceptance and delivery as fast as is currently possible, and/or pre-scheduled requests, in that the requestor requests ARV 402 product acceptance and delivery in the non-immediate future (i.e., minutes from the placement of the request, hours from the placement of the request, days from the placement of the request, ongoing delivery's occurring at a repeating period, or the like). In some embodiments, the product scheduling system 411 and/or product queue 412 may establish a time and location based chronological schedule, calendar, itinerary, timetable, or the like associated with product delivery tasks of the ARV 402. Product delivery module 410 may provide other functionality such as optimizing the particular ARV 402 within the fleet to be assigned to a particular product delivery task, product delivery fee and payment management, product delivery route optimization, product delivery rescheduling and rerouting management, and the like. Product delivery module 410 may provide further functionality as is described further herein.

Person ride source module 420 is program instructions, an application, routine, or sub-routine that is stored upon a storage device and evoked by a processor to manage ARV 402, within a fleet of ARVs, in providing rides to humans or groups of humans, referred herein as a person. Product delivery module 410 may establish a starting location, establish the route of the ARV 402 to pick up a person at the starting location, and establish the route of the ARV 402 from the starting location to a destination location. Person ride source module 420 may include a person scheduling system 421 to receive and accumulate person ride requests and/or a person queue 422 to store such person ride requests. Such requests may generally be on demand requests, in that the requester requests for ARV 402 to provide a ride as fast as is currently possible, and/or pre-scheduled requests, in that the requestor requests for ARV 402 to provide a ride in the non-immediate future (i.e., minutes from the placement of the request, hours from the placement of the request, days from the placement of the request, ongoing rides occurring at a repeating period, or the like). In some embodiments, the person scheduling system 421 and/or person queue 422 may establish a time and location based chronological schedule, calendar, itinerary, timetable, or the like associated with person ride sourcing tasks of the ARV 402. Person ride source module 420 may provide other functionality such as optimizing the particular ARV 402 within the fleet to be assigned to a particular person and ride, person ride fee and payment management, person ride route optimization, person ride rescheduling and rerouting management, and the like. Person ride source module 420 may provide further functionality as is described further herein.

ARV ride sourcing and delivery platform 400 may further include scheduler 415 that manages ARV scheduling between product delivery module 410 and person ride source module 420. Scheduler 415 is program instructions, an application, routine, or sub-routine that is stored upon a storage device and evoked by a processor to manage or reconcile ARV scheduling between product delivery module 410 and person ride source module 420.

Upon receipt of a respective delivery request or ride request, scheduler 415 may inquire product scheduling system 411 and person scheduling system 421 to determine whether the applicable request may be added to the respective queue 412 or 422 without impacting the existing scheduled deliver or ride tasks. In some embodiments, scheduler 415 may favor one module 410 or 420 over the other. For example, scheduler 415 may allow ride share module 420 to accept a new person ride request even if a conflict would exist with an existing delivery task, or vice versa. In some embodiments, scheduler 415 may send a preexisting queued delivery request or send a preexisting queued person ride request to a request pool that is accessible to the fleet of ARVs to be accepted by a different ARV if that request is bumped in favor of the ARV 402 satisfying a new incoming delivery or ride request that would otherwise conflict with the preexisting request.

In embodiments, scheduler 415 may link tasks upon the reconciled ARV 402 schedule with respective linking data structures that provide routes, expected time, or the like that link the positioning of the ARV 402 at the end of one task to the expected positioning and expected time of the start of a subsequent task. In some embodiments, scheduler 415 may reconcile tasks from product delivery module 410 and ride source module 420 by accepting tasks from queues 412, 422 or rejecting task requests back to the request pool in order to minimize the idle time, distance, or the like, necessary for the ARV 402 to move from the positioning of the ARV 402 at the end of one task to the expected positioning and expected time of the start of a subsequent task.

In embodiments, scheduler 415 may further manage concurrent or potentially concurrent tasks. A concurrent task are tasks that are underway at the same time. For example, when a person is being given a ride by ARV 402 while the ARV 402 is also in process of delivering products, such ride task and delivery tasks are concurrent tasks. In a particular example, ARV 402 may be configured to primarily be a product delivery vehicle. However, the module 420 may receive a ride source request from a person. The scheduler 415 may determine that in fulfilling the ride source request, the preexisting product delivery requests would still be satisfactorily fulfilled, and therefore, instruct the module 420 to accept the ride source request. In this manner, ARV 402 may provide a ride to a person whom is to arrive at a destination along or near the delivery route while the delivering of products is underway.

ARV ride sourcing and delivery platform 400 may further include compartment system 440. Compartment system 440 can be attached, integrated, or otherwise connected to the ARV 402. Compartment system 440 includes compartments 441 and may further include compartment access system 442, compartment security system 443, product identification system 444, compartment scheduling system 445, and/or the like.

Each compartment within compartments 441 can secure at least one product therein. A compartment of compartments 441 may be located internal to the ARV 402, such as within grabbing distance to a person station. A compartment of compartments 441 may be located external to the ARV 402, such as within a trunk of the ARV 402 or within a side panel of the ARV 402. The compartments may be of equal or unequal internal volume. For example, compartments 441 may include a plurality of substantially equal-sized compartments. However, other arrangements can be used, for example to accommodate packages of different sizes. In some embodiments, a compartment can include a plurality of sub-compartments, for example an array of smaller compartments sized to accommodate smaller products.

In a particular example, a first product within ARV 402 is associated with a first destination and is secured in a first securable compartment, a plurality of products corresponding to a second destination can be secured in a second securable compartment, and a third securable compartment remains empty in anticipation of receiving a product at the third destination.

ARV ride sourcing and delivery platform 400 may further include compartment access system 442. Compartment access system 442 is a system that locks or otherwise secures one or more compartment within compartments 441. Access to one or more securable compartments 441 can be controlled through access system 442. The access system 442 can include an access information interface displayed upon a display integrated into system 440 or upon display 152, 252, or the like. Upon receipt through the access information interface of compartment access information, the access system 441 can permit access to the compartment associated with the received compartment access information. Access system 442 may include compartment door mechanical, electrical, etc. locks that lock respective compartment doors to a compartment frame so as to secure the compartment.

Access system 442 may include an alphanumeric keypad as part of an access information interface that is displayed upon a display of the system 440 or a display of the system 100, 200, or the like. The alphanumeric keypad can be used for entering compartment access information. Compartment access system 442 may be a single system that secures all compartments 441 or may consist of multiple subsystems that individually secure a particular compartment.

In a particular implementation, compartment access system 442 includes multiple access subsystems for each securable compartment. An accessible or visible portion of each access subsystem can include a keypad and a display window. Additional portions of the access subsystem can be integrated into each door of its compartment.

In some embodiments of the technology, a single access system can be is shared by a plurality of compartments. When a product carrier enters a code or swipes a card, one or more compartments associated with the access system unlock and a display shows the compartment number(s) so the carrier knows which compartment(s) to access. For example, access to all compartments 441 on the curbside of a package delivery platform can be under the control of an access system 442 on the curbside of the package delivery platform, while access to compartments on the rear of the package delivery platform can be under the control of an access subsystem on the rear of the package delivery platform.

Embodiments of a system of the technology, described elsewhere herein, can transmit access information for each of the first, second, and third compartments to the ARV 402 via a communication system of the ARV 402 or to system 100, 200. In some embodiments, the access system 442 can include a near field communication reader, a radio frequency identification (RFID) interrogator, or other such sensor that can be used to authorize access to one or more securable compartments. Access to multiple securable compartments can be provided under a set of single access information, for example, if multiple packages intended for the same addressee do not fit into a single compartment, a single code can be used to control access multiple different compartments.

In a particular implementation, the ARV 402 includes a Personal Identification Number (PIN) pad and a display window interface upon display 152, 252. A first PIN to permit access to the compartment containing the first product can be sent, for example by short message service (SMS) from e.g., module 410, scheduler 415, etc., to the addressee of the first product. A second PIN to permit access to the plurality of packages in the second securable compartment can be sent, for example, by email from e.g., module 410, scheduler 415, etc., to the addressee of the plurality of products in the second securable compartment. Further, a third PIN code to permit access to the third compartment can be sent to a native application executing on system 100 from e.g., module 410, scheduler 415, etc., of a third user to allow the third user to add a package to the third compartment.

For each product delivery destination, a time window during which the ARV 402 is schedule to arrive at the destination can be communicated to the respective addressee, for example, in the same fashion as PINs are communicated to the addressees. Any revisions to the scheduled arrival time for a destination, for example due to traffic, can be transmitted to the addressee in a similar fashion. Each arrival time can be communicated to the appropriate addressee by the delivery platform 400 using its communication subsystem (e.g. system 200), using server 300 of the system in service of platform 400, or the like. In a particular example, scheduler 415 sends "12:00 p.m. today" as an arrival time to the addressee of the first product via e-mail, "1:00 p.m. today" as an arrival time to the addressee of the plurality of second products as an SMS message, and displays an arrival time of "2:00 p.m. today" in a window of a web browser on computing device of the third addressee.

ARV ride sourcing and delivery platform 400 may further include compartment security system 443. Compartment security system 443 is a system that senses product's composition, odor, or other physical attribute to determine possible security threats to ARV 402 or to persons, places, or things within or around ARV 402. For example, compartment security system 443 may include an imaging subsystem (i.e., an x-ray subsystem, a camera subsystem, etc.), an olfactory subsystem, or the like to determine whether the contents of one or more compartments 441 are or may be combined to pose a security threat. In some implementations, compartment security system 443 may be configured to detect explosives, chemicals, or the like that may pose an unacceptable risk. Compartment security system 443 may be a initiating system to other electrical circuits or mechanical components associated with the drivability of ARV 402 such that compartment security system 443 may provide a pass or fail signal to enable or disable these other systems so as to allow the activation (i.e. ARV 402 is able to start, drive, etc.) of such systems or so as to allow the deactivation (i.e., ARV 402 is unable to start, drive, etc.) of such systems.

In a particular implementation, compartment security system 443 sends an enable signal to the drive train system of ARV 402 after it interrogates the compartment containing the first product and determines the first product poses an acceptable security risk. Compartment security system 443 sends a disable signal to the drive train system of ARV 402 after it interrogates the compartment containing the plurality of second products and determines the plurality of second products pose an unacceptable security risk.

ARV ride sourcing and delivery platform 400 may further include product identification system 444. Product identification system 444 is an imaging subsystem that identifies a product from an identification code associated with the product. For example, product identification system 444 may be bar code scanner, QR code scanner, or the like. Product identification system 444 may verify that a product that is or will be housed within compartments 441 is the product that was previously indicated. In a particular implementation, product identification system 444 scans a code associated with the first product and instructs access system 442 to not allow access to compartments 441 since the scanned product is not the first product that was specified by e.g. purchase module 450. Similarly, product identification system 444 may scan a code upon a sales receipt associated with the plurality of second products prior to the access system 442 allowing access compartments 441 and verifies that the plurality of second products are the products that were specified by e.g. purchase module 450.

ARV ride sourcing and delivery platform 400 may further include compartment scheduling system 445. Compartment scheduling system 445 is program instructions, an application, routine, or sub-routine that is stored upon a storage device and evoked by a processor to manage reservations or usage of compartments 441 of ARV 402. Compartment scheduling system 445 may receive a reservation request of one or more compartments within compartments 441 from e.g., system 100, 200, module 410, or the like. The request may further include the requestor's location, the requested compartment size, anticipated compartment usage duration, route to the requestor's location, or the like. Compartment scheduling system 445 may determine if any of the compartments within compartments 441 may satisfy such request. Compartment scheduling system 445 may query scheduler 415 to determine whether the existing reconciled ARV 402 schedule may be unacceptably adversely affected if compartment scheduling system 445 accepts such request. If ARV 402 may satisfy such request without unacceptably adversely impinging upon the existing reconciled ARV 402 schedule, compartment scheduling system 445 may accepts and accumulate such requests. In some implementations, upon the acceptance of a compartment utilization request, such event may be added by scheduler 415 into the reconciled schedule of ARV 402.

As such, compartment scheduling system 445 generally receives and accumulates requests to utilize compartments 441. Such requests may be associated with a request to accept product within compartments 441 and deliver the product to the specified delivery location. Such requests may generally be on demand requests, in that the requester requests a compartment as fast as is currently possible, and/or pre-scheduled compartment requests, in that the requestor requests the compartment in the non-immediate future. In some embodiments, compartment scheduling system 445 may establish a time and location based chronological schedule, calendar, itinerary, timetable, or the like associated with compartment utilizations of the compartments 441 of the ARV 402. Compartment scheduling system 445 may provide other functionality such as optimizing the particular ARV 402 within the fleet to be assigned to a particular compartment utilization request, compartment utilization fee and payment management, route optimization, and the like. Compartment scheduling system 445 may provide further functionality as is described further herein.

ARV ride sourcing and delivery platform 400 may further include facial recognition module 430 that can recognize facial expression of person passengers within one or more person stations in ARV 402. Facial recognition module 430 may include a imaging capture device that captures images of person(s) respective face and a routine or subroutine that analyzes the image or images to determine or detect the mood of the person(s). Functionality of various other ARV 402 systems may be modified based upon the perceived mood of such persons by respective one or more facial recognition modules 430. For example, purchase module 450 may offer one or more products upon display 152, 252, etc. that is within one or more compartments 441 to a ride sourcing person based upon the determined mood of the person by facial recognition module 430.

ARV ride sourcing and delivery platform 400 may further include purchase module 450 that can offer a product for sale to a ride sourcing person within ARV 402. Purchase module 450 is program instructions, an application, routine, or sub-routine that is stored upon a storage device and evoked by a processor to offer a product for sale to a ride sourcing person within ARV 402 upon display 152, 252, etc. The product may currently reside in one or more compartments 441 or may not currently reside in one or more compartments 441 of ARV 402. If the product does not currently reside in compartments 441, purchase module 450 may query scheduler 415 to determine if ARV 402 may add a product fulfillment waypoint to a current or future route to allow for the product to be placed into an available compartment. If the addition of the waypoint location to a current or future route does result in an unacceptable change to the reconciled ARV schedule and if there is a currently available or an anticipated available compartment, e.g., as is confirmed by compartment scheduling system 445, scheduler 415 may add the product fulfillment task to the reconciled ARV schedule.

ARV ride sourcing and delivery platform 400 may further include positioning system 460 that may include a GPS that can determine the position of the ARV 402, enabling it to follow a route, and in some embodiments, enabling ARV 402 to determine its own route. Upon arrival at each destination, the autonomous road vehicle 110 can remain at the destination for a period ("dwell period"), as specified by scheduler 415, that can be predetermined, or dynamically determined. In each case, determination of the dwell period can be based on factors such as the fee of the ride, value of the product, weather conditions, and the nature of the destination, history of interaction with the addressee or ride source person, addressee preferences, and/or ride source person preferences. The dwell period can be extendable, with an arrival notification sent to the intended addressee (in a manner similar to that for ending the PIN) upon arrival, and a reminder sent at the beginning of each extension, with the remaining dwell period included in the notification. In some embodiments of the present technology, the access system 442 can disable access, such as code input, to a compartment when the ARV 402 is not at a predetermined acceptable location.

Unless otherwise denoted or in addition to those element denoted, ARV 402, compartment access system 442, compartment security system 443, product identification system 444, compartment scheduling system 445, product delivery module 410, ride source module 420, scheduler 415, positioning system 460, purchase module 450, facial recognition module may include program instructions, an application, routine, or sub-routine that is stored upon a storage device and evoked by an appropriate hardware device to perform the functions described herein.

Figure 5:
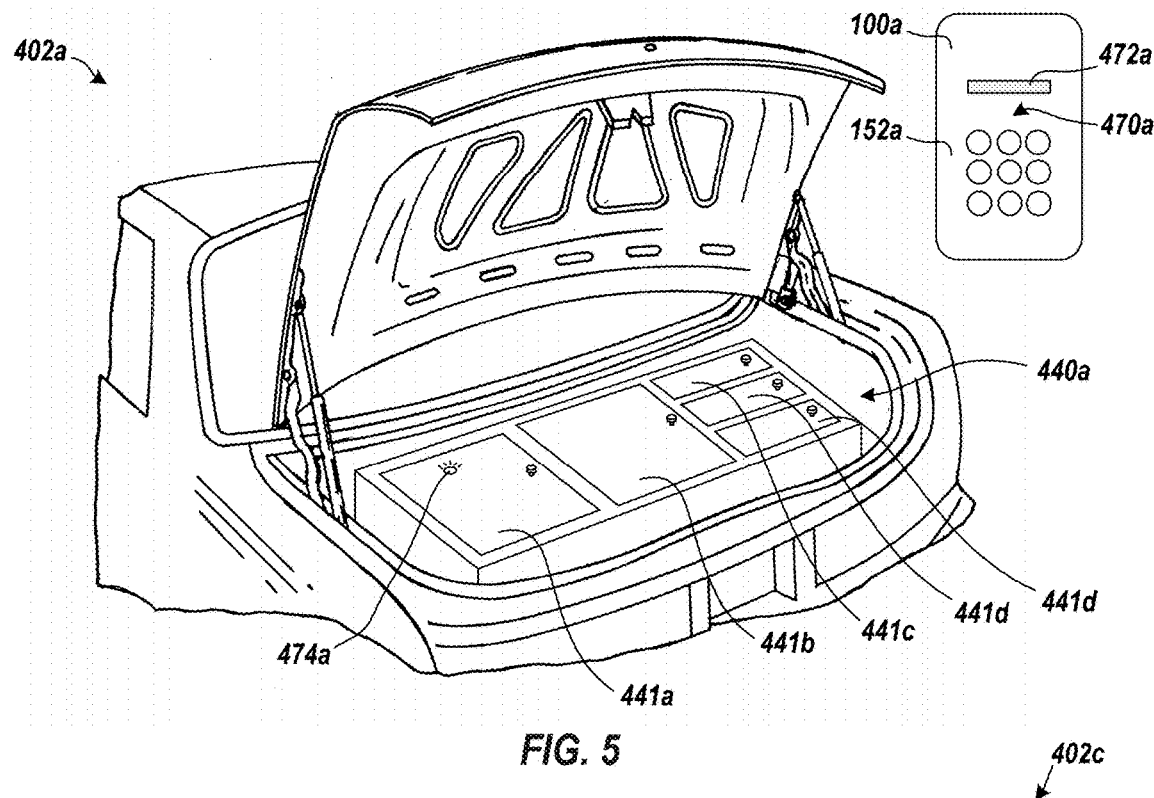
FIG. 5 through FIG. 7 illustrates exemplary autonomous road vehicle compartment systems, according to one or more embodiments.

FIG. 5 illustrates an exemplary ARV ride sourcing and delivery platform 400a, according to one or more embodiments. Platform 400a include compartments 441a, 441b, 441c, 441d, and 441e within a trunk of a car type ARV 402a. In addition to platform 400a, ARV 402a further includes a person accessible door that may be used by a ride sourcing person to enter and exit ARV 402a. In addition to implementations where compartments of platform 400 may be utilized to house products for delivery, platform 400 may further be utilized in embodiments where compartments may be rented as self-storage lockers, rented as service offering compartments (i.e. compartments that may be rented and provide a service like battery charging, faraday cage, or the like). Compartments 441a, 441b, 441c, 441d, and 441d each have respective doors, door handles, or the like that may open and close upon authorization of a requesting person by access system 442a. For clarity, compartment doors may generally be opaque, transparent, mostly opaque with a translucent/transparent portion, or the like.

In a particular implementation, a renter sends a request from device 100a to rent a compartment within ARV 402a as a self-storage locker. The request may indicate a requested arrival time of ARV 402a to a specified location to allow the renter to place one or more products within one or more compartments of ARV 402a. In some instances, the requested location may be the current location of device 100a. The renter may be the ride sourcing person presently being given a ride by ARV 402a, a person that will be offered a ride by ARV 402a in the immediate or non-immediate future, or a person not presently associated with ARV 402a.

The request may be temporarily stored within a request pool, routed to compartment scheduling system 445a of platform 400a if compartment scheduling system 445a indicates that there is an open compartment, routed to scheduler 415a of platform 400a to determine whether the ARV 402a could arrive at the specified location at the requested time without unacceptably impacting the current reconciled schedule of ARV 402a, and the like. Compartment scheduling system 445a may determine that compartment 441a is available and scheduler 415a may determine that ARV 402a may satisfy the renters request and arrive at the specified location at the requested time so that the renter may access e.g., compartment 441a. Resultantly, scheduler 415a may confirm the request and may send a request confirmation to device 100a via text, native application, email, or the like. A code, such as a PIN randomly generated by e.g. system 300, 400a, or the like, may be sent to device 100a along with the confirmation. Upon arrival of ARV 402a at the specified location or reconciled updated location, the renter enters the code into device 100a via keypad 470a upon display 152a and confirms rental payment or rental agreement of compartment 441a by manipulating object 472a upon display 152a.

The entered code may be sent to server 300 encrypted and sent to platform 400a, routed to access system 442a, and unencrypted by the access system 442a. The access system 442a may confirm the code is correct and may unlock the door of compartment 441a or otherwise allow access to the securable inner portion of compartment 441a. Compartment 441a may include a light 474a or other identifier to bring attention to the renter of the assigned compartment. After the renter places the product into the rented compartment, the renter may again enter the code into the keypad 470a. The entered code may be sent to server 300 encrypted and sent to platform 400a, routed to access system 442, and unencrypted by the access system 442. The access system 442 may confirm the code is correct and may lock the door of compartment 441a or otherwise secure the securable inner portion of compartment 441a. A security system 443a of platform 400a may further confirm whether the product within compartment 441a poses an unacceptable security threat prior to further action by ARV 402a. Upon the rental of compartment 441a, compartment scheduling system 445a may remove compartment 441a from the queue of available compartments that are currently available for product delivery or available for compartment rental.

After compartment 441a is rented, ARV 402a may give one or more persons a ride and/or may deliver various products presently within or accepted by available compartments 441b, 441c, 441d, and/or 441e and transporting the products to one or more specified delivery locations. In embodiments where the rented compartment offers a service to e.g., the ride source person of ARV 402, there may or may not be intervening ride tasks or intervening product acceptance/delivery tasks during the rental period.

Subsequently, the renter (the same person whom made the rental request from 100a or a different person whom the renter authorizes to retrieve the product, both hereinafter referred to as authorized renter) may desire to obtain the product or products within compartment 441a of ARV 402. For example, the original renter may sell the contents of compartment 441a to a buyer. The buyer may be authorized by the renter within access system 442a in order for access system 442a to obtain the purchased items.

The authorized renter may resultantly send a request from their device 100 to retrieve from compartment 441a within ARV 402a. The request may indicate a requested arrival time of ARV 402a to a specified location to allow the authorized renter to retrieve one or more products within compartment 441a. In some instances, the requested location may be the current location of device 100.

The request may be temporarily stored within a request pool and routed to scheduler 415a of platform 400a to determine whether the ARV 402a could arrive at the specified location at the requested time without unacceptably impacting the current reconciled schedule of ARV 402a, and the like. Scheduler 415a may determine that ARV 402a may satisfy the authorized renter's request and arrive at the specified location at the requested time so that the renter may access and retrieve from compartment 441a. Resultantly, scheduler 415a may confirm the request and may send a request confirmation to the appropriate requesting device 100 via text, native application, email, or the like. A code, such as a PIN randomly generated by e.g. system 300, 400a, or the like, may be sent to requesting device 100 along with the confirmation. Upon arrival of ARV 402a at the specified location or reconciled updated location, the authorized renter enters the code into requesting device 100 upon display 152. The authorized renter may further confirm any applicable additional rental payments of compartment 441a, may confirm product payment for the purchase of the products contained within compartment 441a, or the like.

The entered code may be sent to server 300 encrypted and sent to platform 400a, routed to access system 442, and unencrypted by the access system 442. The access system 442a may confirm the code is correct and may unlock the door of compartment 441a or otherwise allow access to the securable inner portion of compartment 441a. Compartment 441a may include a light 474a or other identifier to bring attention to the authorized renter of the compartment that contains the applicable product. After the authorized renter retrieves the product into the rented compartment, the door of compartment 441a may be closed and locked by access system 442a. The security system 443a may further confirm whether the product has been removed from the compartment and whether any new items have been placed into compartment 441a. Upon the retrieval of products from compartment 441a, compartment scheduling system 445a may add compartment 441a to the queue of available compartments that are currently available for product delivery or available for compartment rental.

Figure 6:
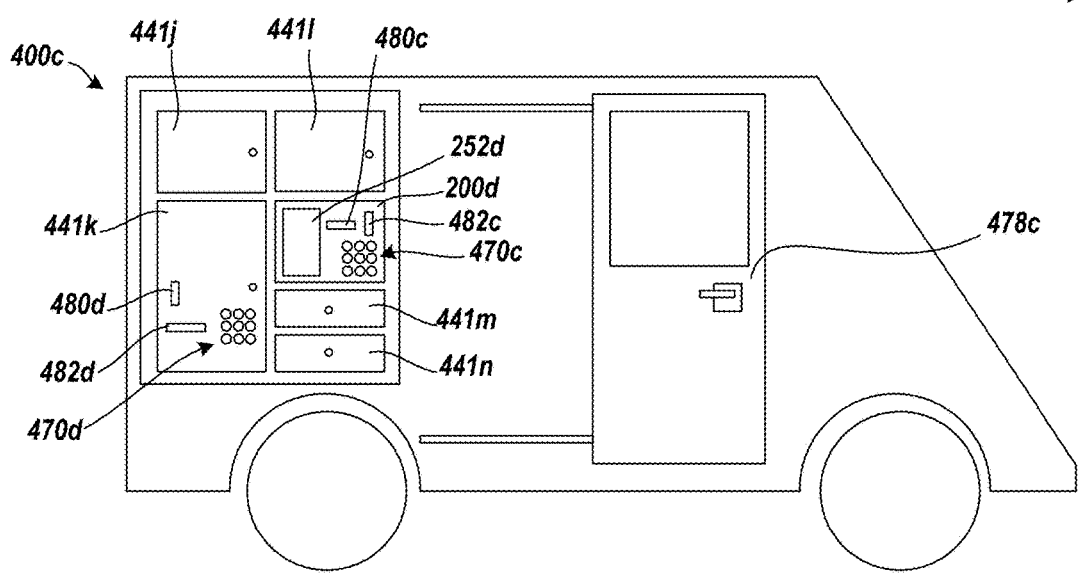

FIG. 6 illustrates an exemplary ARV ride sourcing and delivery platform 400c, according to one or more embodiments. Platform 400c is associated with ARV 402c and includes compartments 441j, 441k, 441l, 441m, and 444n that are accessible from the outside the ARV 402c. In addition to platform 400c, ARV 402c further includes one or more person accessible doors 478c that may be used by a ride sourcing person to enter and exit ARV 402c. In addition to implementations where compartments of platform 400c may be utilized to house products for delivery, platform 400c may further be utilized in embodiments where compartments may be utilized in the fulfillment of one or more products. Compartments 441j, 441k, 441l, 441m, and 444n each have respective doors, door handles, or the like. Each compartment door may open and close upon authorization by a person, robot, or the like by access system 442c as is further described below.

In a particular implementation, a buyer purchases a product and indicates that the purchased product should be fulfilled by and located within an ARV within the fleet of ARVs that which the buyer will subsequently be a ride sourcing passenger thereof. As such, the buyer may be able to subsequently obtain the purchased good from a compartment of the ARV that fulfills the product purchase. The purchase may be made from purchase module 450c, a native application of the buyer's device 100, from a native application upon a computer which is hosted by e.g. server 300, or the like. The product purchase may be made instantaneously with the buyer's ride source request, prior to the buyer's ride source request, or subsequent to the buyer's ride source request. As is indicated above, the ride source request may include the pickup location of the buyer and a requested pick up time.

The product purchased by the buyer may be from the same entity relative to the entity that manages the fleet of ARVs or from a different entity relative to the entity that manages fleet of ARVs. If the product purchase by the buyer is from the different entity, the product purchase information may be routed from that different entity to e.g., computers 200, 300, or the like of the fleet managing entity to be placed in the request pool for the ARVs to respectively determine whether any of the ARVs may obtain the product prior to the buyers ride without unacceptably impacting the current reconciled ARV schedule of any of the ARVs.

Platform 400c may identify both the product fulfillment request from the buyer and the ride source request from the buyer within the request pool. Scheduler 415c determines that ARV 402c may satisfy the ride source request by scheduler 415c and ride source module 420c determining whether the ARV 402c may arrive at the requested location at the requested time to pick up the buyer without unacceptably impacting the current reconciled ARV schedule of scheduler 415c. That is, ARV 402c determines that it may arrive at the requested location at the requested time to pick up the buyer without unacceptably impacting the current person ride source schedule (i.e., the requested ride of the buyer does not unacceptably impact the rides of the persons in the queue 422c) or without unacceptably impacting the current product delivery schedule (i.e., the requested ride of the buyer does not unacceptably impact the delivery of the goods within occupied compartments).

Scheduler 415c also determines whether ARV 402c may satisfy the fulfillment request by initially determining if any of the ride sourcing passengers within the queue 422c that will be given rides by ARV 402c between the time of the product purchase by the buyer and the pickup time of the buyer (herein referred to as intervening persons) are willing to waypoint or alter the route of their ride to allow the ARV 402c to arrive at a fulfillment location to accept the purchase good. Scheduler 415c may make such determination by displaying an accept fulfillment query upon a screen 252 (e.g., display 252d, or the like) within ARV 402c to one or more intervening persons or by instructing server 300 of the fleet manager to push the accept fulfillment query upon screen 152 of the applicable intervening persons.

The accept fulfillment query may be sent to one or more intervening person while those intervening persons are within ARV 402c or prior to one or more intervening persons being picked up by ARV 402c. Scheduler 415c may rank the intervening persons based upon the least impact to the reconciled ARV 402c schedule and sequentially send the accept fulfillment query to the intervening persons in the order of the ranked list. For example, scheduler 415c may create a ranked list of the intervening persons based upon the likelihood of there being an available compartment at the time the intervening persons are within ARV 402c and sequentially send the accept fulfillment query to the intervening persons in the order of the ranked list.

Scheduler 415c also determines whether there is (i.e. a compartment is currently unoccupied and is not scheduled to be occupied prior to expected time of placement of the purchased product within the compartment) or will be an unoccupied compartment (i.e. a compartment is currently occupied but is scheduled to be unoccupied prior to expected time of placement of the purchased product within the compartment) of ARV 402c that may contain or house the purchased product at the time one or more intervening persons are within ARV 402c until the time the buyer will be picked up by ARV 402c.

In an embodiment, an intervening person accepts the fulfillment query (herein referred to as the accepting intervening person) thereby indicating the accepting intervening person is willing to waypoint or alter the route of their ride to allow the ARV 402c to arrive at a fulfillment location to accept the purchased good. Resultantly, scheduler 415c or purchase module 450c confirms to the buyer, via SMS, email, or by a native application with the buyers device 100, that the product will be accepted by the ARV 402c that which his or her future ride is scheduled. The fee of the accepting intervening person's ride may be reduced to promote the collective likelihood of the intervening persons to accept the fulfillment query and/or the fee associated with the buyer's ride may be increased.

Upon the arrival of the ARV 402c to the fulfillment location, a code, such as a PIN randomly generated by e.g. system 200c, 300 of the manager of the fleet, or the like, may be sent to device 100 of the seller or a representative of the seller (i.e. an agent, robot, contractor, or the like), hereinafter collectively referred to as the seller fulfiller. The seller fulfiller may enter the code into his or her device 100, upon display 252d of ARV 402c, or the like. The entered code may be sent to server 300 of the entity that manages the fleet of ARVs, encrypted and sent to platform 400c, routed to access system 442c, and unencrypted by the access system 442c. The access system 442c may confirm the code is correct and may unlock the door of the determined unoccupied compartment 441j, 441k, 441l, 441m, or 441n or otherwise allow access to the securable inner portion of the unoccupied compartment.

Alternatively or in addition, the seller fulfiller may scan the product with a bar code scanner 480c, 480d, or the like of product identification system 444c, to confirm the product to be placed in ARV 402c is the purchased product. In some implementations, the scanning of the product by the seller fulfiller and confirmation of the product to be placed in ARV 402c is the purchased product may trigger the system 442c to unlock the door of the determined unoccupied compartment 441j, 441k, 441l, 441m, or 441n or otherwise allow access to the securable inner portion of the unoccupied compartment After the seller fulfiller places the product into the assigned compartment 441j, 441k, 441l, 441m, or 441n, the seller fulfiller may again enter the same or different code into his or her device 100, upon display 252d of ARV 402c, or the like. The entered code may be sent to server 300 of the managing entity of the fleet of ARVs, encrypted and sent to platform 400c, routed to access system 442c, and unencrypted by the access system 442c. The access system 442c may confirm the code is correct and may lock the door of compartment 441j, 441k, 441l, 441m, or 441n, or otherwise secure the securable inner portion of the assigned compartment. Alternatively, the access system 442c may close and lock the applicable compartment door after a predetermined time threshold. For example, upon security system 443c confirming a product is placed within the compartment, the access system 442c may close and lock the applicable compartment door after a lapse of five seconds. The security system 443c may also confirm whether the product within the compartment poses an unacceptable security threat prior to further action or activity by ARV 402c.

Upon the arrival of the ARV 402c to the pickup location of the buyer, a code, such as a PIN randomly generated by e.g. system 200c, 300 of the fleet manager, or the like, may be sent to device 100 of the buyer. The buyer may enter the code into his or her device 100, upon display 252d of ARV 402c, or the like. The entered code may be sent to server 300 of the entity of the fleet of ARVs, encrypted and sent to platform 400c, routed to access system 442c, and unencrypted by the access system 442c. The access system 442c may confirm the code is correct and may unlock the door of the compartment 441j, 441k, 441l, 441m, or 441n that which contains the purchased product or otherwise allow access to the securable inner portion of the applicable compartment. The ARV 402c then fulfills the purchase by the buyer receiving the purchased product from the accessible compartment. Security system 444c may determine whether the product was removed from the accessible compartment. For example, the system 444c imaging system may detect an empty compartment, a scale of the system 444c may indicate an empty compartment, or the like. Subsequently, the access system 442c may again secure the compartment. Upon the purchased product removal from compartment 441j, 441k, 441l, 441m, or 441n, compartment scheduling system 445c may add the applicable compartment to the queue of available compartments that are currently available for product delivery or available for compartment rental.

As depicted in FIG. 6, a keypad 470c, bar code scanner 480c, and/or credit card reader 482c that may be utilized to access multiple compartments or may include a keypad 470d, bar code scanner 480d, and/or credit card reader 482d to be utilized by a single compartment. The credit card reader 482 may be utilized by ride sourcing person or delivery managers to pay for rides and product deliveries.

Figure 7:
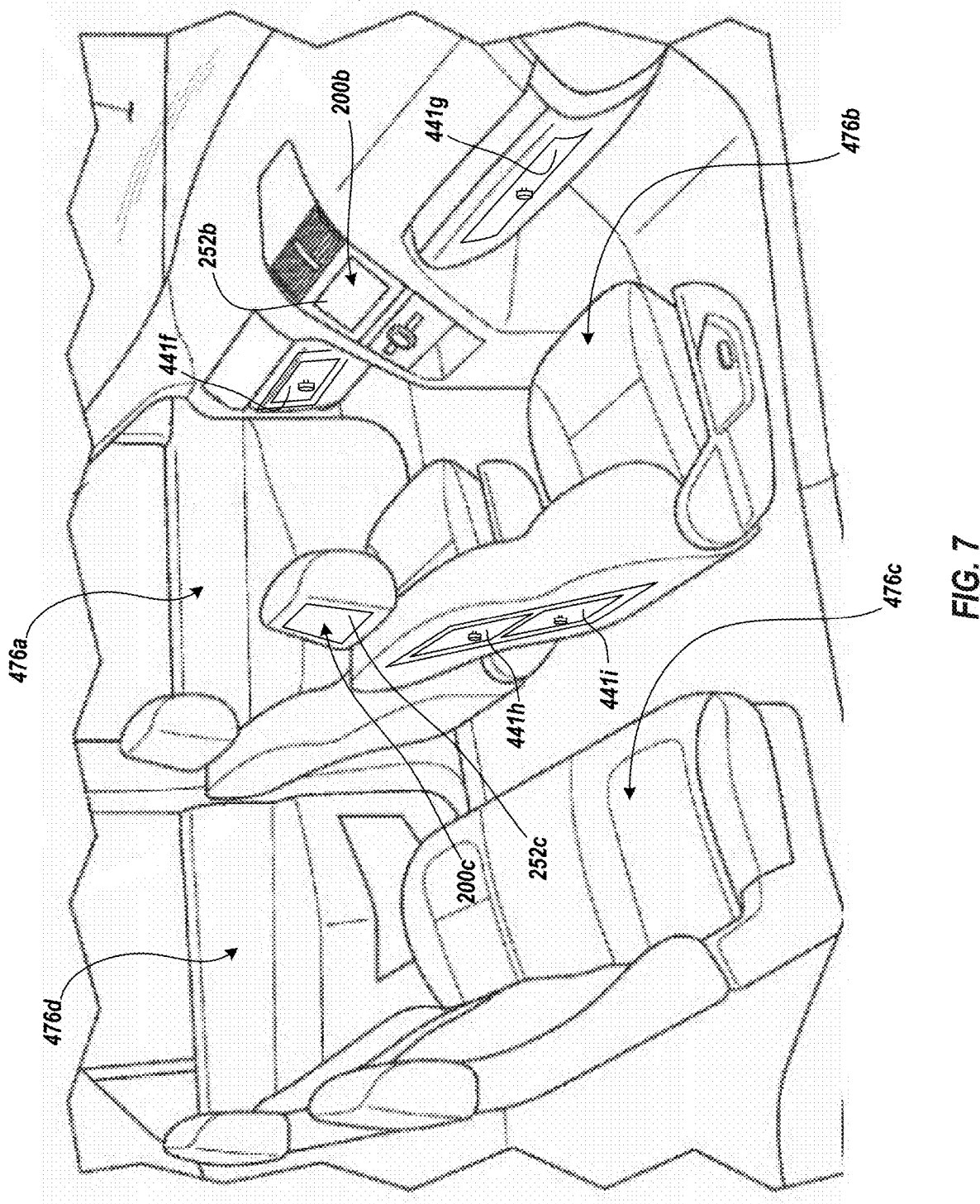

FIG. 7 illustrates an exemplary ARV ride sourcing and delivery platform 400b, according to one or more embodiments. Platform 400b is associated with ARV 402b and includes compartments 441f, 441g, 441h, and 441i that are accessible from within or on the inside of ARV 402b and are associated with person station 476a, 476b, and/or 476c. In addition to platform 400b, ARV 402b further includes one or more person accessible doors that may be used by a ride sourcing person to enter and exit ARV 402b. In addition to implementations where compartments of platform 400b may be utilized to house products for delivery, platform 400b may further be utilized in embodiments where compartments may be utilized in the fulfillment of one or more products. Compartments 441f, 441g, 441h, and 441i each have respective doors, door handles, or the like. Each compartment door may open and close upon authorization by a person by access system 442c as further described below.

In a particular implementation, a buyer purchases a product and indicates that the purchased product should be fulfilled by and located within an ARV within the fleet of ARVs that which the buyer will subsequently be a ride sourcing passenger thereof. As such, the buyer may be able to subsequently obtain the purchased good from a compartment of the ARV that fulfills the product purchase. The purchase may be made from purchase module 450b, a native application of the buyer's device 100b, from a native application upon a computer which is hosted by e.g. server 300, or the like. The product purchase may be made instantaneously with the buyer's ride source request, prior to the buyer's ride source request, or subsequent to the buyer's ride source request. As is indicated above, the ride source request may include the pickup location of the buyer and a requested pick up time.

The product purchased by the buyer may be from the same entity relative to the entity that manages the fleet of ARVs or from a different entity relative to the entity that manages fleet of ARVs. If the product purchase by the buyer is from the different entity, the product purchase information may be routed from that different entity to e.g., computers 200, 300, or the like of the fleet managing entity to be placed in the request pool for the ARVs to respectively determine whether any of the ARVs may obtain the product prior to the buyers ride without unacceptably impacting the current reconciled ARV schedule of any of the ARVs.

Platform 400b may identify both the product fulfillment request from the buyer and the ride source request from the buyer within the request pool. Scheduler 415b determines that ARV 402b may satisfy the ride source request by scheduler 415b and ride source module 420b determining whether the ARV 402b may arrive at the requested location at the requested time to pick up the buyer without unacceptably impacting the current reconciled ARV schedule of scheduler 415b. That is, ARV 402b determines that it may arrive at the requested location at the requested time to pick up the buyer without unacceptably impacting the current person ride source schedule (i.e., the requested ride of the buyer does not unacceptably impact the rides of the persons in the queue 422b) or without unacceptably impacting the current product delivery schedule (i.e., the requested ride of the buyer does not unacceptably impact the delivery of the goods within occupied compartments).

Scheduler 415b also determines whether ARV 402b may satisfy the fulfillment request by initially determining if any of the ride sourcing passengers within the queue 422b that will be given rides by ARV 402b between the time of the product purchase by the buyer and the pickup time of the buyer (herein referred to as intervening persons) are willing to waypoint or alter the route of their ride to allow the ARV 402b to arrive at a fulfillment location to accept the purchase good. Scheduler 415b may make such determination by displaying an accept fulfillment query upon a screen 252 (e.g., display 252b, 252c, or the like) within ARV 402b to one or more intervening persons or by instructing server 300 of the fleet manager to push the accept fulfillment query upon screen 152 of the applicable intervening persons.

The accept fulfillment query may be sent to one or more intervening person while those intervening persons are within ARV 402b or prior to one or more intervening persons being picked up by ARV 402b. Scheduler 415b may rank the intervening persons based upon the least impact to the reconciled ARV 402b schedule and sequentially send the accept fulfillment query to the intervening persons in the order of the ranked list. For example, scheduler 415b may create a ranked list of the intervening persons based upon the likelihood of there being an available compartment at the time the intervening persons are within ARV 402b and sequentially send the accept fulfillment query to the intervening persons in the order of the ranked list.

Scheduler 415b also determines whether there is (i.e. a compartment is currently unoccupied and is not scheduled to be occupied prior to expected time of placement of the purchased product within the compartment) or will be an unoccupied compartment (i.e. a compartment is currently occupied but is scheduled to be unoccupied prior to expected time of placement of the purchased product within the compartment) of ARV 402b that may contain or house the purchased product at the time one or more intervening persons are within ARV 402b until the time the buyer will be picked up by ARV 402b.

In an embodiment, an intervening person accepts the fulfillment query (herein referred to as the accepting intervening person) thereby indicating the accepting intervening person is willing to waypoint or alter the route of their ride to allow the ARV 402b to arrive at a fulfillment location to accept the purchased good. Resultantly, scheduler 415b or purchase module 450b confirms to the buyer, via SMS, email, or by a native application with the buyers device 100, that the product will be accepted by the ARV 402b that which his or her future ride is scheduled. The fee of the accepting intervening person's ride may be reduced to promote the collective likelihood of the intervening persons to accept the fulfillment query and/or the fee associated with the buyer's ride may be increased.

Upon the arrival of the ARV 402b to the fulfillment location, a code, such as a PIN randomly generated by e.g. system 300, 400a, or the like, may be sent to device 100 of the accepting intervening person. Upon arrival of ARV 402b at the fulfillment location, the accepting intervening person may scan the product with product identification system 444b to confirm the product to be placed in ARV 402b is the purchased product. The accepting intervening person may also enter the code into his or her device 100, upon display a 252b, 252c of ARV 402b, or the like. The entered code may be sent to server 300 of the entity that manages the fleet of ARVs, encrypted and sent to platform 400b, routed to access system 442b, and unencrypted by the access system 442b. The access system 442b may confirm the code is correct and may unlock the door of the determined unoccupied compartment 441f, 441g, or 441h or otherwise allow access to the securable inner portion of the unoccupied compartment.

After the accepting intervening person places the product into the assigned compartment 441f, 441g, or 441h, the accepting intervening person may again enter the code into his or her device 100, upon display a 252b, 252c of ARV 402b, or the like. The entered code may be sent to server 300 of the managing entity of the fleet of ARVs, encrypted and sent to platform 400b, routed to access system 442b, and unencrypted by the access system 442b. The access system 442b may confirm the code is correct and may lock the door of compartment 441f, 441g, or 441h, or otherwise secure the securable inner portion of the assigned compartment. A security system 443b of platform 400b may further confirm whether the product within the compartment poses an unacceptable security threat prior to further action by ARV 402b.

Upon the arrival of the ARV 402b to the pickup location of the buyer, a code, such as a PIN randomly generated by e.g. system 200b, 300 of the fleet manager, or the like, may be sent to device 100 of the buyer. The buyer may enter the code into his or her device 100, upon display a 252b, 252c of ARV 402b, or the like. The entered code may be sent to server 300 of the entity of the fleet of ARVs, encrypted and sent to platform 400b, routed to access system 442b, and unencrypted by the access system 442b. The access system 442b may confirm the code is correct and may unlock the door of the compartment 441f, 441g, or 441h that which contains the purchased product or otherwise allow access to the securable inner portion of the compartment 441f, 441g, or 441h that which contains the purchased product. The ARV 402b then fulfills the purchase by the buyer receiving the purchased product from the accessible compartment. Security system 444b may determine whether the product was removed from the accessible compartment. For example, the system 444b imaging system may detect an empty compartment, a scale of the system 444b may indicate an empty compartment, or the like. Subsequently, the access system 442b may again secure the compartment. Upon the purchased product removal from compartment 441f, 441g, or 441h, compartment scheduling system 445b may add the applicable compartment to the queue of available compartments that are currently available for product delivery or available for compartment rental.

As depicted in FIG. 7, a single system 200b may be utilized in association with one or more compartments 441f, 441g, or the like within different person stations 476a, 476b, a single system 200c may be utilized in association with one or more compartments within a single person station 476c. In some embodiments, a system 200 may be accessible or within reach of persons within each person station 476 writhing the ARV 402.

In some embodiments, purchase module 450b may display an interface upon screens, 252b, 252c that offers a product that is contained within a compartment 441f, 441g, 441h, 441i for sale to a ride source person currently within the person station. Similarly, purchase module 450b may instruct server 300 of the fleet manager to instruct the native application upon the ride source person device 100 to display an interface thereupon that offers a product that is contained within a compartment 441f, 441g, 441h, 441i for sale to the ride source person currently within the person station. Purchase module may alter which product is offered by utilizing facial recognition module 460c to determine a perceived mood of the ride source person within the person station. The product offered for sale may be previously placed in 441f, 441g, 441h, 441i by an entity (agent, contractor, robot, or the like) of the manager of the fleet of ARVs or by a ride source person that took a ride within ARV 402b prior to the ride source person currently within the person station.

Figure 8:
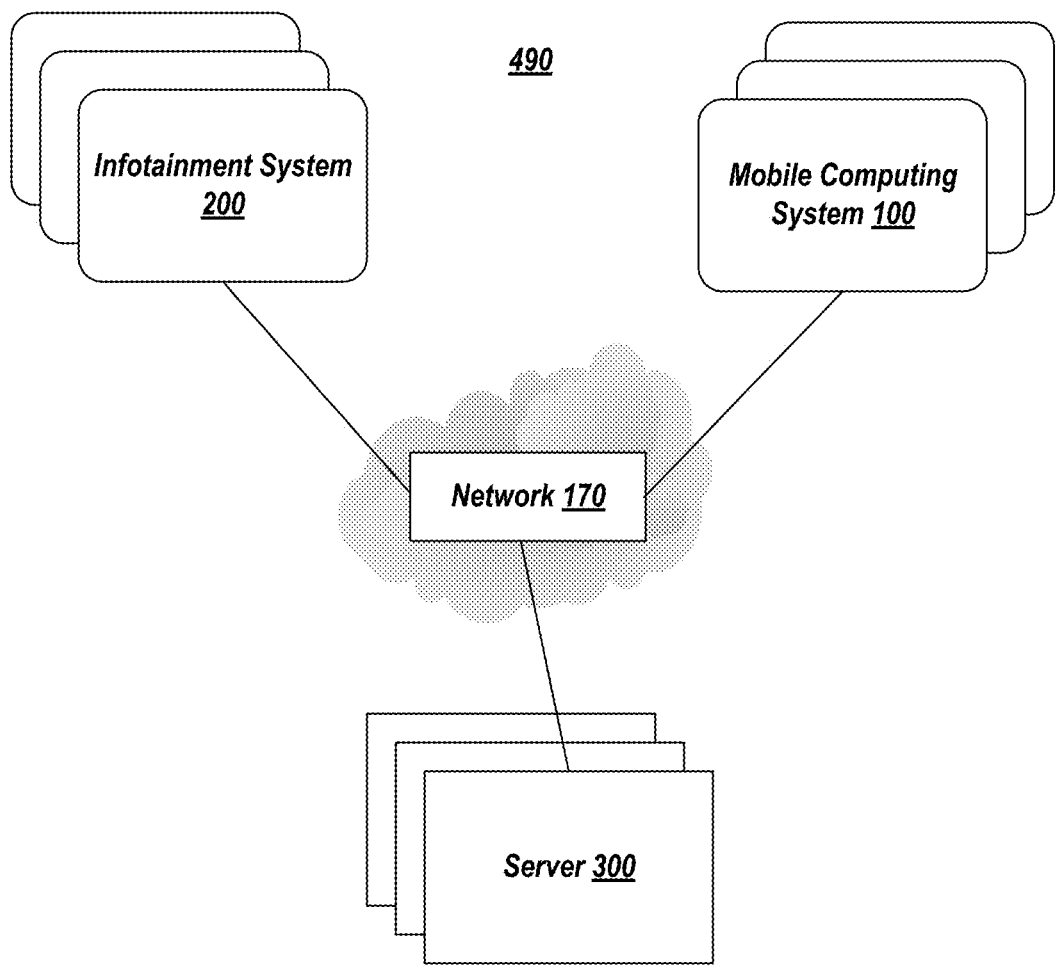
FIG. 8 illustrates an autonomous ride source and delivery data handling system, according to one or more embodiments.

FIG. 8 illustrates an autonomous ride source and delivery data handling system 490, according to one or more embodiments. System 490 includes devices 100, 200, and 300; each of which may be configured to communicate with one another via communications network 170. In some embodiments, a user associated with a device (e.g., device 100) must install a native application and/or make a feature selection to obtain the benefits of the techniques described herein.

Network 170 includes one or more wired or wireless telecommunications means by which devices may exchange data. For example, the network 170 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each device 100, 200, 300 can include a communication module capable of transmitting and receiving data over the network 170. For example, each network device can include a server, a desktop computer, a laptop computer, a tablet computer, a television with one or more processors embedded therein and/or coupled thereto, a smart phone, a handheld computer, a personal digital assistant (PDA), or any other wired or wireless processor-driven device, as would be applicable. In the example implementations, a user may operate the device 100, and ARV fleet manager system operator may operate devices 200 and devices 300. Further, another entity, such as a retailer that offers goods for sale, may also operate one or more device 300s that may be connected to the ARV fleet manager devices 200, 300, and or the user's device 100.

Figure 9:
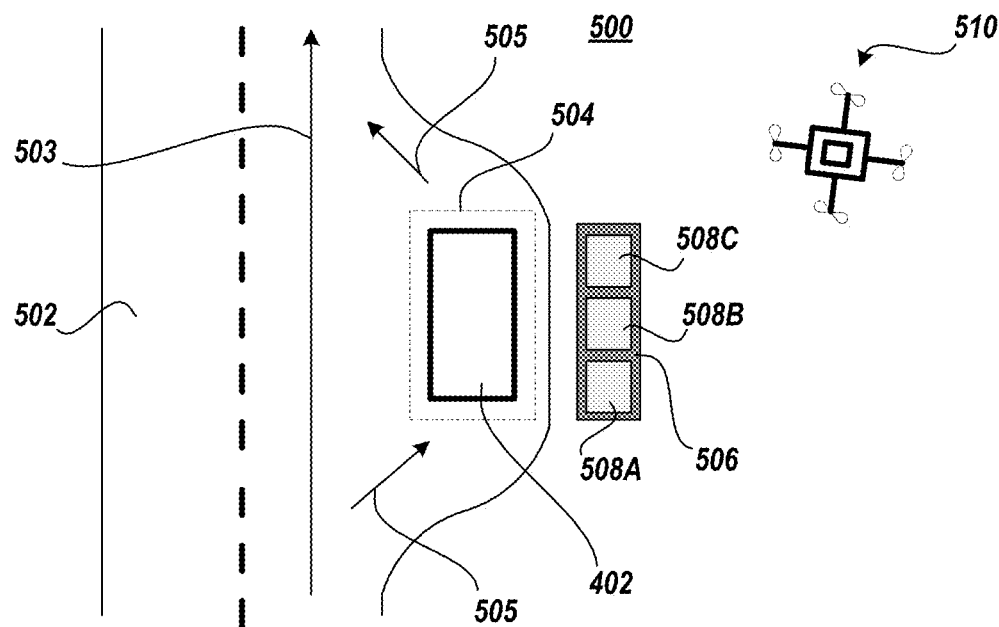
FIG. 9 and FIG. 10 illustrate exemplary product fulfillment schemes, according to one or more embodiments.

FIG. 9 illustrates an exemplary product fulfillment scheme 500, according to one or more embodiments. In scheme 500, a product buyer has purchased a good and has indicated that he or she would like for an ARV to fulfill the product such that the product is available for the buyer to obtain from a compartment 441 immediately prior to the buyer being given a ride in the ARV 402, during the buyer being given a ride in the ARV 402, or after the buyer has been given a ride in the ARV 402. In scheme 500 the intervening person or the seller fulfiller may place the purchased product within the available compartment 441. The buyer may submit a ride source request and/or a fulfillment request which may be stored in a request queue of system 300 of the fleet manager or within a request queue of system 200 of ARV 402.

ARV 402 proceeds upon a determined route 503 associated with the ride of the intervening person upon a road 502. The intervening person has previously accepted a product fulfillment query. As such, the intervening person has accepted that ARV 402 may alter the path of the previously determined route 503 to a waypoint location 504 via a waypoint route 505. In some embodiments, the distance from waypoint location 504 to any point along route 503 is minimized. Waypoint location 504 may be a designated roadway, parking spot, pull off, or the like integral to or near road 502 for which ARVs to stop without affecting other traffic upon road 502. Near waypoint location 504 (e.g., within 10 feet, within 20 feet, within 50 feet so as to limit time necessary to move the product from handoff location 506 to waypoint location 504) is a product handoff location 506 that is a predetermined location that which a seller fulfiller, such as a robot, drone 510, or the like, may delivery and leave purchased product that which may subsequently be moved into the assigned compartment 441 in ARV 402 by e.g., the intervening person. Different waypoint locations 504 may be generally known by ARV 402.

In some embodiments, the arrival time of the seller fulfiller to handoff location 506 and the arrival time of ARV 402 to waypoint location 504 may be contemporaneous. In some embodiments, the arrival time of the seller fulfiller is "just in time" relative to the arrival of ARV 402 such that the arrival of the ARV 402 to waypoint location 504 occurs just after the seller fulfiller has dropped the product at the handoff location 506 and/or has left handoff location 506. Handoff location 506 may include multiple zones 508A, 508B, and/or 508C. In some embodiments, the intervening person may be notified by an interface upon screen 252, 152 of the intervening person's device 100, etc. of which zone contains the product to be moved within the assigned compartment. Zone 508 is a subarea of handoff location 506.

In some embodiments, ARV 402 may determine if a location 504 is occupied by a different ARV and will not stop at that location 504. As such, the ARV 402 may change to a different known waypoint location 504 and may send such update to e.g., server 300 of the seller and routed to the seller fulfiller so that the seller fulfiller may drop off the product at the handoff location 506 associated with the new waypoint location 504.

Upon the arrival of ARV 402 to waypoint location 504 to and the seller fulfiller to handoff location 506, the accepting intervening person may retrieve the purchase good from handoff location 506 and place the purchase good in the assigned compartment as is disclosed herein. Alternatively, upon the arrival of ARV 402 to waypoint location 504, the seller fulfiller drop the purchased good in the assigned compartment.

Figure 10:
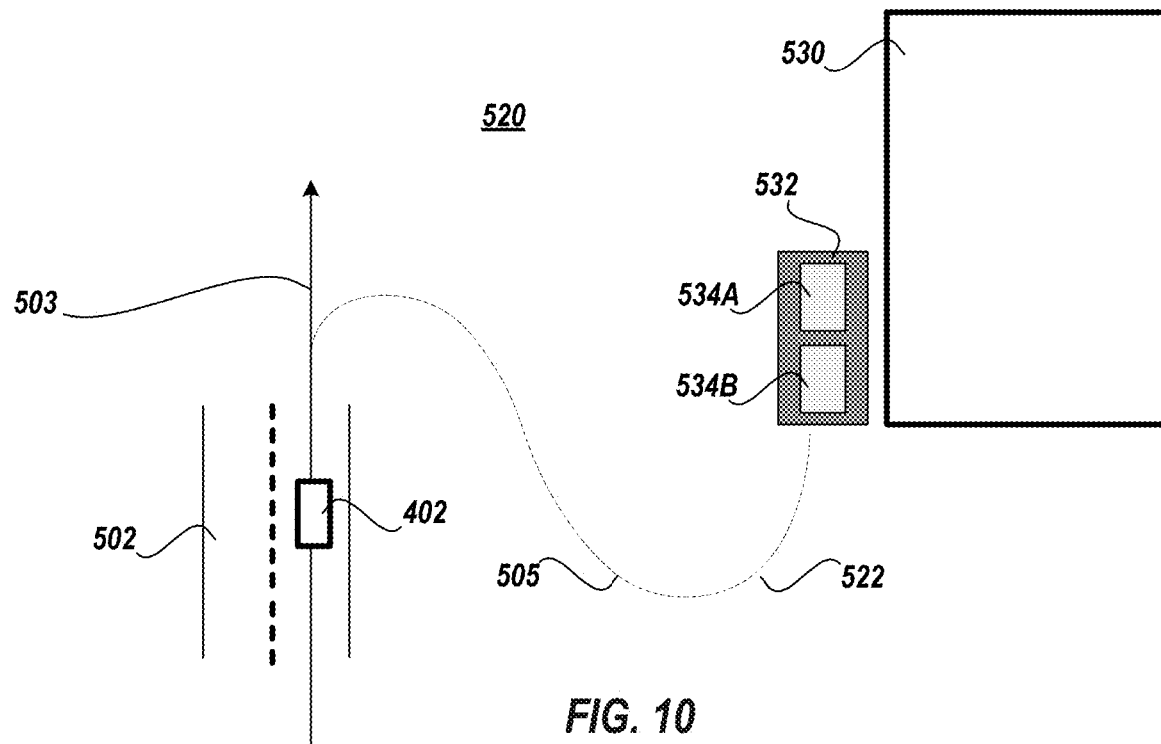

FIG. 10 illustrates an exemplary product fulfillment scheme 520, according to one or more embodiments. In scheme 520, a product buyer has purchased a good and has indicated that he or she would like for an ARV to fulfill the product such that the product is available for the buyer to obtain from a compartment 441 immediately prior to the buyer being given a ride in the ARV 402, during the buyer being given a ride in the ARV 402, or after the buyer has been given a ride in the ARV 402. In scheme 520 the intervening person or the seller fulfiller may place the purchased product within the available compartment 441.

ARV 402 proceeds upon the determined route 503 associated with the ride of the intervening person upon road 502. The intervening person has previously accepted a product fulfillment query. As such, the intervening person has accepted that ARV 402 may alter the path of the previously determined route 503 to a seller handoff location 532 via a waypoint route 505. In some embodiments, the distance 522 along route 505 is minimized. Handoff location 532 may be a designated parking spot, designated area, near a retail store or distribution center, herein referred to as seller fulfillment location 532 that is designated for ARVs to stop. Different seller handoff locations 532 may be designated by the seller and generally known by ARV 402.

In some embodiments, the arrival time of the seller fulfiller to handoff location 532 and the arrival time of ARV 402 to handoff location 532 may be contemporaneous, prior thereto, or subsequent thereto.

In some embodiments, ARV 402 may determine if a location 532 is occupied by a different ARV and will not stop at that location 532. As such, the ARV 402 may change to a different known location 532 and may send such update to e.g., server 300 of the seller and routed to the seller fulfiller so that the seller fulfiller may be in or be notified of the new location.

Upon the arrival of ARV 402 to location 532 and the seller fulfiller to location 532, the accepting intervening person may retrieve the purchase good from the seller fulfiller and place the purchase good in the assigned compartment as is disclosed herein. Alternatively, arrival of ARV 402 and the seller fulfiller to location 532, the seller fulfiller may place the purchase good in the assigned compartment as is disclosed herein.

Figure 11:
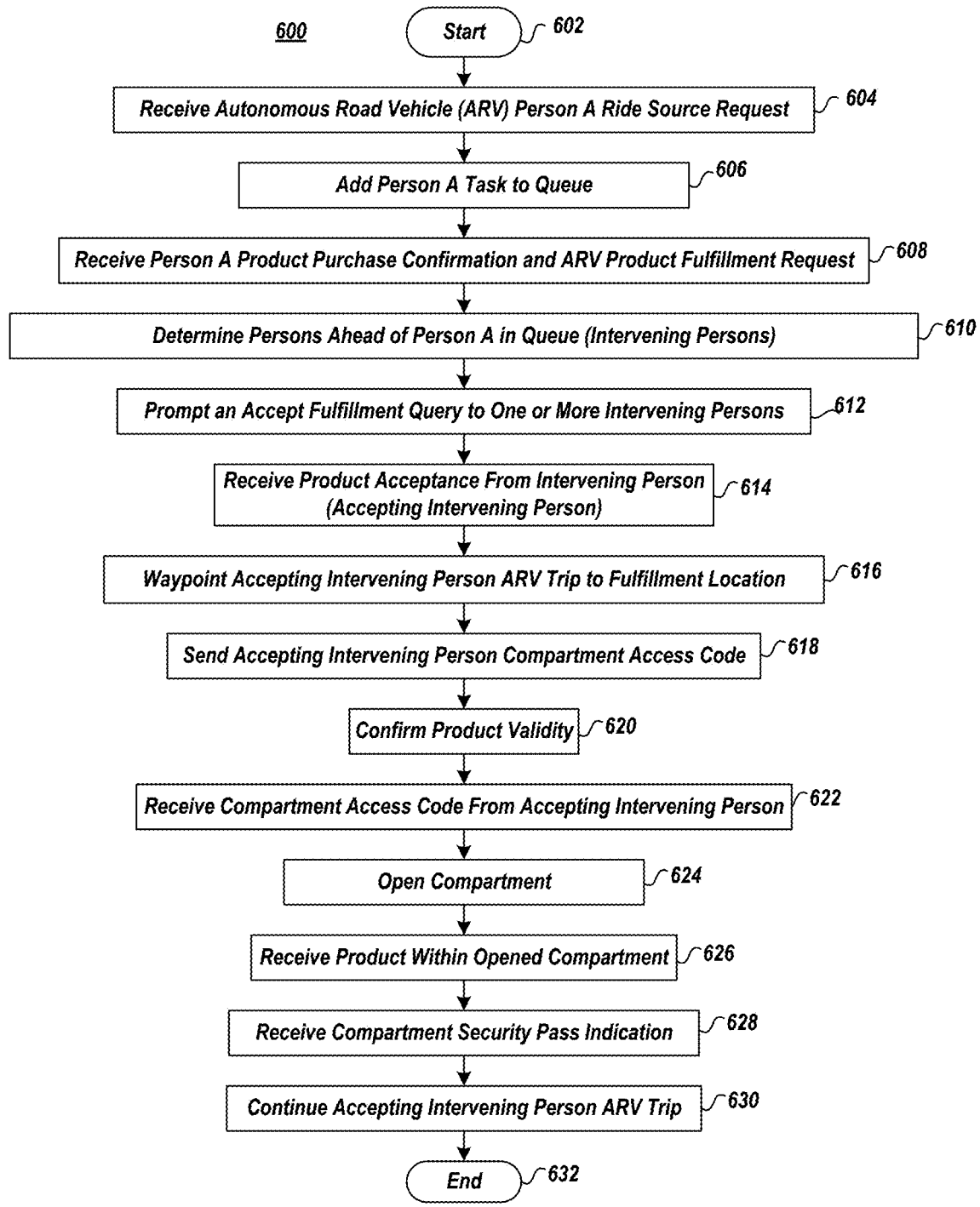
FIG. 11 illustrates a method for product fulfillment within an autonomous ride source and delivery vehicle, according to one or more embodiments.

FIG. 11 illustrates a method 600 for product fulfillment with an ARV 402, according to one or more embodiments. Method 600 may be implemented by systems 100, 200, and/or 300, in conjunction with platform 400, to fulfill a ride source and purchase fulfillment request by the ARV 402 of a buyer that is scheduled to receive a ride source ride from the ARV 402. Method 600 begins at block 602 and continues with receiving an ARV ride source request from Person A (block 604). For example, ride source module 420 may receive the request from a request pool maintained by one or more servers 300 of the ARV 402 manager, one or more servers 300 of the ARV 402 manager receives the request and routes the request to the request pool and pings the applicable ARVs 402 that are expected to be or known to be in the area of Person A for each respective ride source module 420 to determine if they may satisfy the request, or the like. Subsequently, platform 400 may determine that the associated ride should not unacceptably conflict or impact the current reconciled schedule of the ARV 402.

Method 600 may continue with adding the associated Person A ride source task to the person scheduling queue 422 and/or to the reconciled queue of the accepting ARV 402. For example, ride source module 420 adds the Person A ride task to the person scheduling queue 422, scheduler 415 adds the Person A ride task to the reconciled queue of both queue 422 and queue 412. In addition, scheduler 415 may add respective linking data structures that link the newly added Person A ride task with the task that immediately precede and immediately follow the Person A ride task. The linking data structures may effectively instruct the ARV 402 to proceed from the preceding location to the location associated with Person A's request and to proceed from the destination location associated with Person A's request to the subsequent location.

Method 600 may continue by receiving a confirmation of a product purchase, or a product purchase request, by Person A along with an ARV product fulfillment request (block 608). For example, Person A purchases a product from a website hosted upon a server 300 of a retailer or a website hosted upon a server 300 of the ARV fleet manager. The purchase fee could be made by Person A at the time of purchase or at a time associated with Person A's ride. The purchase request/confirmation and the request for ARV 402 to fulfill such request may be received by system 200, server 300 of the ARV fleet manager, system 400, scheduler 415 or the like of ARV 402. System 445 and/or module 410 may subsequently determine whether any compartments 441 of ARV 402 are or are anticipated to be available to accept the purchase product. If system 445 and/or module 410 determine that no compartments 441 of ARV 402 are or are anticipated to be available to accept the purchase product, Person A's ride source task may be removed from the current ARV 402 and the requests may be sent to the request pool for other ARVs to determine whether the other Arv's could satisfy Person A's ride source request and product fulfillment request.

Method 600 may continue determine persons ahead of Person A (intervening persons) in the person scheduling queue 422 (block 610). For example, there may be ten persons that ARV 402 is scheduled to give a ride between the current time of accepting Person A's ride task and the scheduled ride task of Person A. Those ten persons are examples of intervening persons to Person A.

Method 600 may continue with displaying or otherwise providing an accept fulfillment query to the determined intervening persons (block 612). For example, scheduler 415 may display or otherwise accept the fulfillment query upon screen 252 within ARV 402 to one or more intervening persons or by instructing server 300 of the fleet manager to push the accept fulfillment query to screen 152 of the applicable intervening persons.

The accept fulfillment query may be sent to one or more intervening person while those intervening persons are within ARV 402 or prior to one or more intervening persons being picked up by ARV 402. Scheduler 415 may rank the intervening persons based upon the least impact to the reconciled ARV 402 schedule and sequentially send the accept fulfillment query to the intervening persons in the order of the ranked list. For example, scheduler 415 may create a ranked list of the intervening persons based upon the likelihood of there being an available compartment at the time the intervening persons are within ARV 402 and sequentially send the accept fulfillment query to the intervening persons in the order of the ranked list.

Scheduler 415b may also determine whether there is (i.e. a compartment is currently unoccupied and is not scheduled to be occupied prior to expected time of placement of the purchased product within the compartment) or will be an unoccupied compartment (i.e. a compartment is currently occupied but is scheduled to be unoccupied prior to expected time of placement of the purchased product within the compartment) of ARV 402 that may contain or house the purchased product at the time one or more intervening persons are within ARV 402 until the time the buyer will be picked up by ARV 402.

Method 600 may continue with receiving a confirmation or acceptance of the accept fulfillment query from an intervening person, referred to as the accepting intervening person (block 614). For example, scheduler 415 receives the intervening person acceptance of the fulfillment query which indicates the accepting intervening person is willing to waypoint or alter the route of their ride to allow the ARV 402 to arrive at a fulfillment location to accept the purchased product. Resultantly, scheduler 415 or purchase module 450 may confirm to the buyer, via SMS, email, or by a native application with the buyers device 100, that the product will be accepted by the ARV 402 that which his or her future ride is scheduled. The fee of the accepting intervening person's ride may be reduced to promote the collective likelihood of the intervening persons to accept the fulfillment query and/or the fee associated with the buyer's ride may be increased.

Method 600 may continue with way pointing the accepting intervening person's route to a product fulfillment location (block 616). For example, the accepting intervening person's route 503 is diverted along a new route 505 to fulfillment location 504 near a handoff location 506 adjacent to road 502, the accepting intervening person's route 503 is diverted along a new route 522 to a fulfillment location 532 near a seller location 530, or the like.

Method 600 may continue with sending the accepting intervening person an access code to access an available compartment within ARV (block 618). For example, upon the arrival of the ARV 402 to the fulfillment location, a code, such as a PIN randomly generated by e.g. system 300 of the ARV fleet manager, 400, or the like, may be sent to device 100 of the accepting intervening person.

Method 600 may continue with confirming the product validity to ensure that the product that is to be placed in the compartment is in fact the purchased product (block 620). For example, upon arrival of ARV 402 at the fulfillment location, the accepting intervening person may scan the product with product identification system 444 to confirm the product to be placed in ARV 402 is the purchased product.

Method 600 may continue with receiving the access code with the compartment access system from the accepting intervening person (block 622). For example, the accepting intervening person may also enter the code into his or her device 100, with system 200, upon display a 252 of ARV 402, or the like. The entered code may be received by the access system 442. Method 600 may continue with opening or allowing access to the predetermined compartment if the entered code is correct (block 624). For example, the access system 442 may confirm the code is correct and may unlock the door of the determined unoccupied compartment 441 or otherwise allow access to the securable inner portion of the unoccupied compartment 441.

Method 600 may continue with receiving the product within the opened compartment (block 626). For example, the accepting intervening person places the product into the assigned opened compartment 441, the accepting intervening person may again enter the code into his or her device 100, upon system 200, upon display a 252 of ARV 402, or the like. The entered code may be sent or received by access system 442. The access system 442 may confirm the code is correct and may lock the door of compartment or otherwise secure the securable inner portion of the assigned compartment. Alternatively, the access system 442 may close and lock the door of the compartment after a lapse of a predetermined time period.

Method 600 may continue with receiving a security pass indication (block 628). For example, security system 443 of platform may confirm whether the product within the compartment poses an unacceptable security threat prior to further action by ARV 402. Method 600 may continue with continuing the ride source task of the accepting intervening person (block 630). For example, a route is determined from the fulfillment location to the destination of the accepting intervening person and the ARV follows such route. Method 600 may end at block 632.

Figure 12:
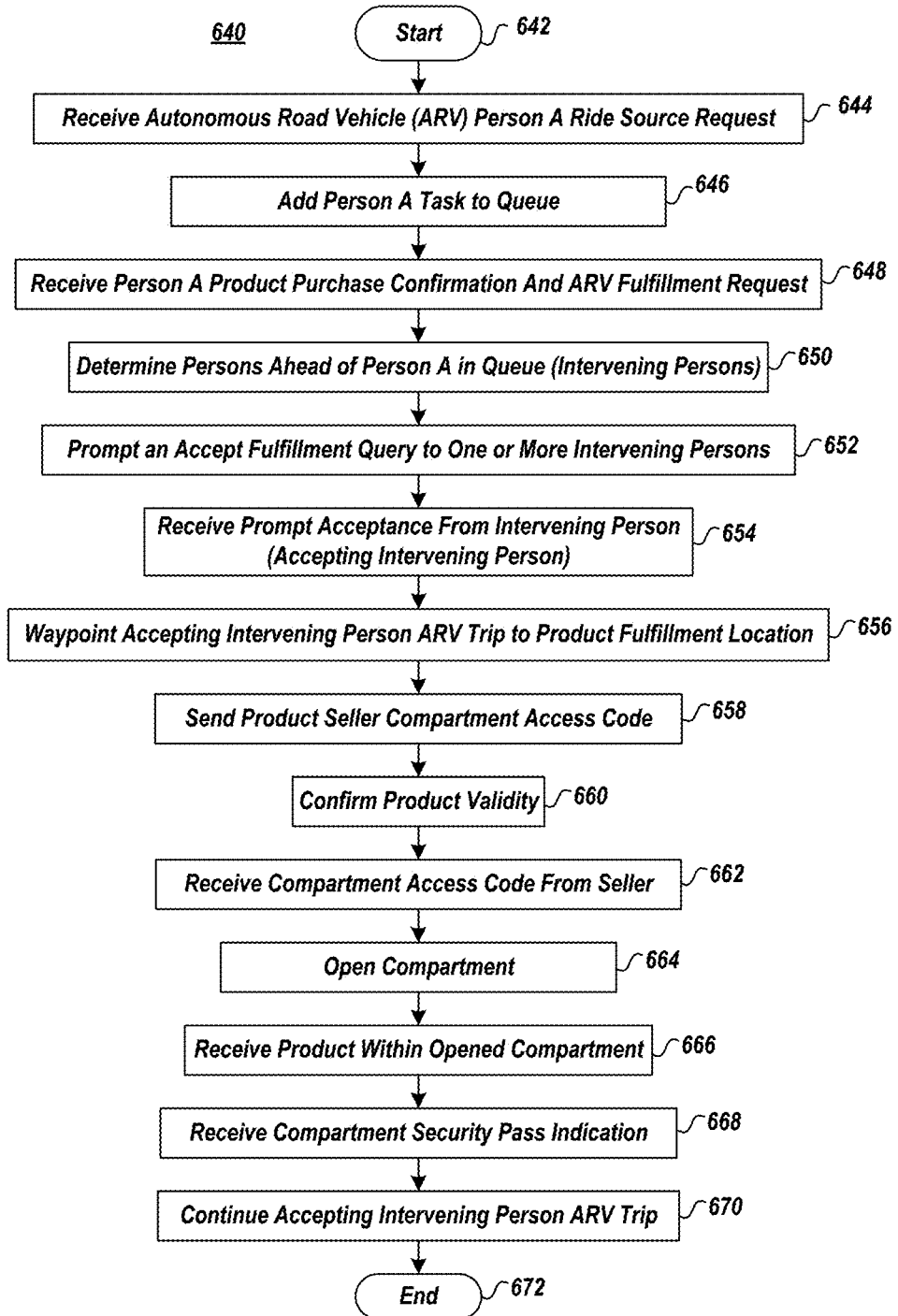
FIG. 12 illustrates a method for product fulfillment within an autonomous ride source and delivery vehicle, according to one or more embodiments.

FIG. 12 illustrates a method 640 for product fulfillment with an ARV 402, according to one or more embodiments. Method 640 may be implemented by systems 100, 200, and/or 300, in conjunction with platform 400, to fulfill a ride source and purchase fulfillment request by the ARV 402 of a buyer that is scheduled to receive a ride source ride from the ARV 402. Method 640 begins at block 642 and continues with receiving an ARV ride source request from Person A (block 644). For example, ride source module 420 may receive the request from a request pool maintained by one or more servers 300 of the ARV 402 manager, one or more servers 300 of the ARV 402 manager receives the request and routes the request to the request pool and pings the applicable ARVs 402 that are expected to be or known to be in the area of Person A for each respective ride source module 420 to determine if they may satisfy the request, or the like. Subsequently, platform 400 may determine that the associated ride should not unacceptably conflict or impact the current reconciled schedule of the ARV 402.

Method 640 may continue with adding the associated Person A ride source task to the person scheduling queue 422 and/or to the reconciled queue of the accepting ARV 402 (block 646). For example, ride source module 420 adds the Person A ride task to the person scheduling queue 422, scheduler 415 adds the Person A ride task to the reconciled queue of both queue 422 and queue 412. In addition, scheduler 415 may add respective linking data structures that link the newly added Person A ride task with the task that immediately precede and immediately follow the Person A ride task. The linking data structures may effectively instruct the ARV 402 to proceed from the preceding location to the location associated with Person A's request and to proceed from the destination location associated with Person A's request to the subsequent location.

Method 640 may continue by receiving a confirmation of a product purchase, or a product purchase request, by Person A along with an ARV product fulfillment request (block 648). For example, Person A purchases a product from a website hosted upon a server 300 of a retailer or a website hosted upon a server 300 of the ARV fleet manager. The purchase fee could be made by Person A at the time of purchase or at a time associated with Person A's ride. The purchase request/confirmation and the request for ARV 402 to fulfill such request may be received by system 200, server 300 of the ARV fleet manager, system 400, scheduler 415 or the like of ARV 402. System 445 and/or module 410 may subsequently determine whether any compartments 441 of ARV 402 are or are anticipated to be available to accept the purchase product. If system 445 and/or module 410 determine that no compartments 441 of ARV 402 are or are anticipated to be available to accept the purchase product, Person A's ride source task may be removed from the current ARV 402 and the requests may be sent to the request pool for other ARVs to determine whether the other Arv's could satisfy Person A's ride source request and product fulfillment request.

Method 640 may continue determine persons ahead of Person A (intervening persons) in the person scheduling queue 422 (block 650). For example, there may be ten persons that ARV 402 is scheduled to give a ride between the current time of accepting Person A's ride task and the scheduled ride task of Person A. Those ten persons are examples of intervening persons to Person A.

Method 640 may continue with displaying or otherwise providing an accept fulfillment query to the determined intervening persons (block 652). For example, scheduler 415 may display or otherwise accept the fulfillment query upon screen 252 within ARV 402 to one or more intervening persons or by instructing server 300 of the fleet manager to push the accept fulfillment query to screen 152 of the applicable intervening persons.

The accept fulfillment query may be sent to one or more intervening person while those intervening persons are within ARV 402 or prior to one or more intervening persons being picked up by ARV 402. Scheduler 415 may rank the intervening persons based upon the least impact to the reconciled ARV 402 schedule and sequentially send the accept fulfillment query to the intervening persons in the order of the ranked list. For example, scheduler 415 may create a ranked list of the intervening persons based upon the likelihood of there being an available compartment at the time the intervening persons are within ARV 402 and sequentially send the accept fulfillment query to the intervening persons in the order of the ranked list.

Scheduler 415*b* may also determine whether there is (i.e. a compartment is currently unoccupied and is not scheduled to be occupied prior to expected time of placement of the purchased product within the compartment) or will be an unoccupied compartment (i.e. a compartment is currently occupied but is scheduled to be unoccupied prior to expected time of placement of the purchased product within the compartment) of ARV 402 that may contain or house the purchased product at the time one or more intervening persons are within ARV 402 until the time the buyer will be picked up by ARV 402.

Method 640 may continue with receiving a confirmation or acceptance of the accept fulfillment query from an intervening person, referred to as the accepting intervening person (block 654). For example, scheduler 415 receives the intervening person acceptance of the fulfillment query which indicates the accepting intervening person is willing to waypoint or alter the route of their ride to allow the ARV 402 to arrive at a fulfillment location to accept the purchased product. Resultantly, scheduler 415 or purchase module 450 may confirm to the buyer, via SMS, email, or by a native application with the buyers device 100, that the product will be accepted by the ARV 402 that which his or her future ride is scheduled. The fee of the accepting intervening person's ride may be reduced to promote the collective likelihood of the intervening persons to accept the fulfillment query and/or the fee associated with the buyer's ride may be increased.

Method 640 may continue with way pointing the accepting intervening person's route to a product fulfillment location (block 656). For example, the accepting intervening person's route 503 is diverted along a new route 505 to fulfillment location 504 near a handoff location 506 adjacent to road 502, the accepting intervening person's route 503 is diverted along a new route 522 to a fulfillment location 532 near a seller location 530, or the like.

Method 640 may continue with sending the seller fulfiller an access code to access an available compartment within ARV (block 658). For example, upon the arrival of the ARV 402 to the fulfillment location, a code, such as a PIN randomly generated by e.g. system 300 of the ARV fleet manager, 400, or the like, may be sent to a device 100 of the seller fulfiller, or to the seller fulfiller directly (e.g., the PIN is sent to a seller fulfiller drone, robot or the like).

Method 640 may continue with confirming the product validity to ensure that the product that is to be placed in the compartment is in fact the purchased product (block 660). For example, upon arrival of ARV 402 at the fulfillment location, the seller fulfiller may scan the product with product identification system 444 to confirm the product to be placed in ARV 402 is the purchased product.

Method 640 may continue with receiving the access code with the compartment access system from the seller fulfiller (block 662). For example, the seller fulfiller may also enter the code into his or her device 100, upon a keypad 470 of ARV 402, or the like. The entered code may be received by the access system 442. Method 640 may continue with opening or allowing access to the predetermined compartment if the entered code is correct (block 664). For example, the access system 442 may confirm the code is correct and may unlock the door of the determined unoccupied compartment 441 or otherwise allow access to the securable inner portion of the unoccupied compartment 441.

Method 640 may continue with receiving the product within the opened compartment (block 626). For example, the fulfiller seller places the product into the assigned opened compartment 441, the fulfiller seller may again enter the code into his or her device 100, upon a keypad 470 of ARV 402, or the like. The entered code may be sent or received by access system 442. The access system 442 may confirm the code is correct and may lock the door of compartment or otherwise secure the securable inner portion of the assigned compartment. Alternatively, the access system 442 may close and lock the door of the compartment after a lapse of a predetermined time period.

Method 640 may continue with receiving a security pass indication (block 668). For example, security system 443 of platform may confirm whether the product within the compartment poses an unacceptable security threat prior to further action by ARV 402. Method 640 may continue with continuing the ride source task of the accepting intervening person (block 670). For example, a route is determined from the fulfillment location to the destination of the accepting intervening person and the ARV follows such route. Method 640 may end at block 672.

Method 600 and/or 640 may alternatively continue with the arrival of the ARV 402 to the pickup location of Person A. A code, such as a PIN randomly generated by e.g. system 200, 300 of the fleet manager, or the like, may be sent to device 100 of Person A. Person A may enter the code into his or her device 100, upon system 200, upon display a 252 of ARV 402, or the like. The entered code may be sent to access system 442. The access system 442 may confirm the code is correct and may unlock the door of the compartment 441 that which contains the purchased product or otherwise allow access to the securable inner portion of the compartment 441 that which contains the purchased product. The ARV 402 then fulfills the purchase by Person A retrieving or receiving the purchased product from the accessible compartment. Security system 444 may determine whether the product was removed from the accessible compartment. For example, the system 444 imaging system may detect an empty compartment, a scale of the system 444 may indicate an empty compartment, or the like. Subsequently, the access system 442 may again secure the compartment. Upon the purchased product removal from compartment 441 compartment scheduling system 445 may add the applicable compartment to the queue of available compartments that are currently available for product delivery or available for compartment rental.

Figure 13:
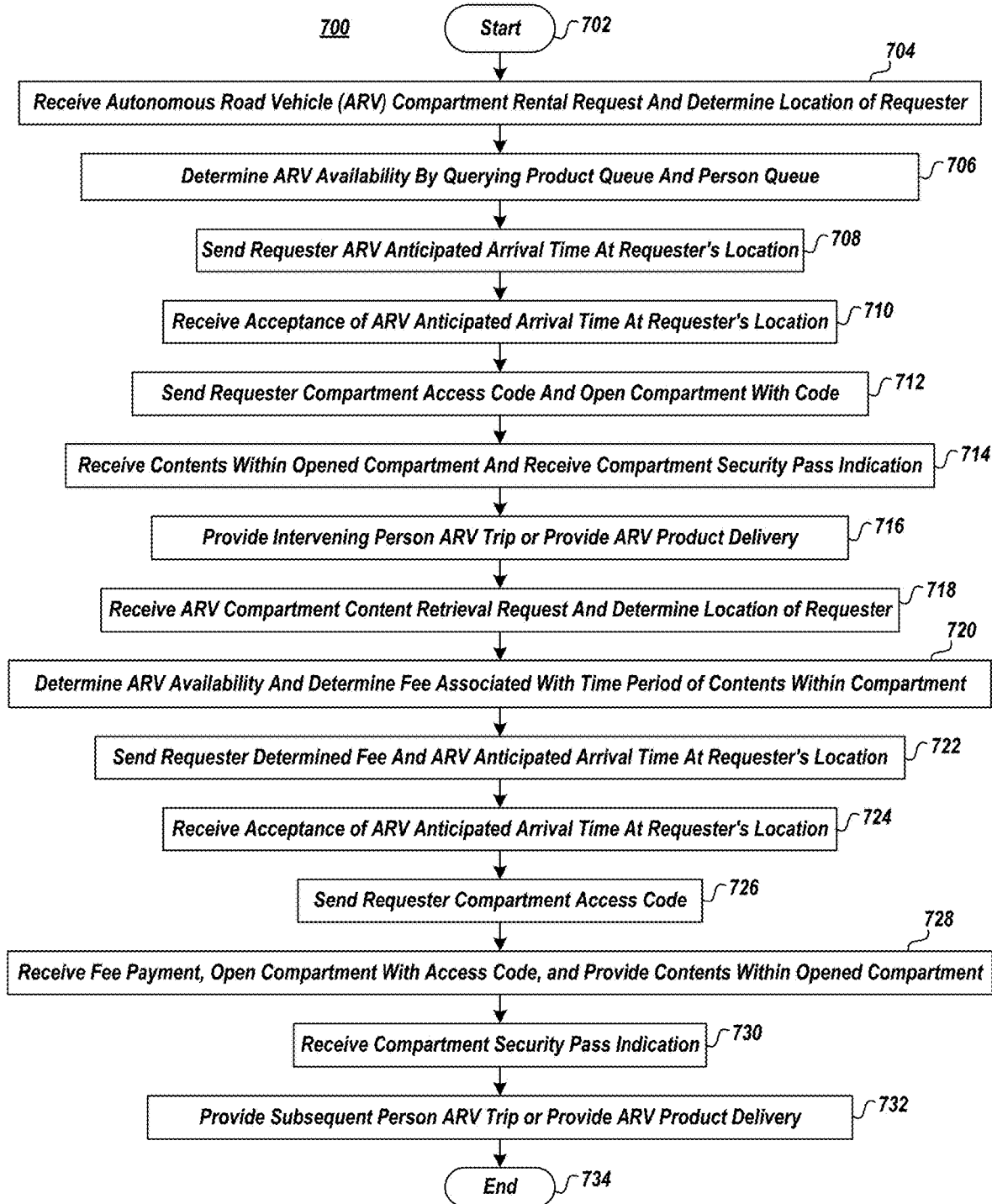
FIG. 13 illustrates a method for compartment rental within an autonomous ride source and delivery vehicle, according to one or more embodiments.

FIG. 13 illustrates a method 700 for compartment 441 rental within ARV 402, according to one or more embodiments. Method 700 may be implemented by systems 100, 200, and/or 300, in conjunction with platform 400, to rent a compartment 441 of ARV 402. In method 700, the compartment 441 serves as a storage compartment where a product or other item is housed within the rented compartment 441.

Method 700 begins at block 702 and continues with receiving an ARV compartment reservation request and determining a requested pickup location associated with the reservation request (block 704). For example, a renter sends a request from device his or her device 100 to rent a compartment within ARV 402 as a self-storage compartment. The request may indicate a requested arrival time of ARV 402 to a pickup location to allow the renter to place one or more products within one or more compartments of ARV 402. In some instances, the requested location may be the current location of the renter's device 100. The renter may be the ride sourcing person presently being given a ride by ARV 402, a person that will be offered a ride by ARV 402 in the immediate or non-immediate future, or a person not presently associated with ARV 402. The request may be temporarily stored within the request pool maintained by e.g., server 300 of the manager of the fleet of ARVs 402, routed to compartment scheduling system 445 of platform 400 if compartment scheduling system 445 indicates that there is an open compartment or a there is a compartment scheduled to be open by the time of arrival at the pickup location.

Method 700 may continue with determining ARV availability by querying the product scheduling queue and the person scheduling queue (block 706). For example, the request may be routed to scheduler 415 of platform 400 to determine whether the ARV 402 could arrive at the specified pickup location at the requested time without unacceptably impacting the current reconciled schedule (i.e. product delivery schedule and person ride schedule) of ARV 402. Compartment scheduling system 445 may determine that compartment 441 is available and scheduler 415 may determine that ARV 402 may satisfy the renters request and arrive at the specified location so that the renter may access the available compartment 441.

Method 700 may continue with sending an anticipated arrival time of the ARV to the requested location (block 708). For example, scheduler 415 may confirm the rental request and may send an anticipated arrival confirmation to device 100 of the renter via text, native application, email, or the like. Method 700 may continue with device 100 of the renter receiving the anticipated arrival time of the ARV to the requested location (block 710).

Method 700 may continue with sending a compartment access code to the renter and the renter opening the available compartment utilizing the access code. For example, a PIN randomly generated by e.g. system 300 of the manager of the ARV fleet, may be sent to device 100 of the renter. Upon arrival of ARV 402 at the requested location the renter enters the code into device his or her device 100, enters the code upon a keypad of ARV 402, or the like. The entered code may be received by the access system 442. The access system 442 may confirm the code is correct and may unlock the door of compartment 441 or otherwise allow access to the securable inner portion of compartment 441.

Method 700 may continue with receiving the product or other item within the accessible compartment 441 and receiving a security pass indication (block 714). For example, after the renter places the product into the rented compartment 441, the renter may again enter the code into the keypad, and upon code confirmation, locks the compartment door. Alternatively, the access system 442 may close and lock the door after a predetermined time period, or may close and lock the door upon the detection of the product. Security system 443 may further confirm whether the product within compartment 441 poses an unacceptable security threat prior to further action by ARV 402. For example, the imaging system or olfactory system may determine that the product is not unacceptably hazardous.

Upon the rental of compartment 441, compartment scheduling system 445 may remove compartment 441 from the queue of available compartments that are currently available for product delivery or available for compartment rental.

Method 700 may continue with ARV 402 giving one or more intervening persons a ride and/or may deliver various products presently within other compartments of ARV 402 (block 716). In other words, the ARV 402 begins, accomplishes, or the like other ride source tasks and/or product delivery tasks not associated with the renter.

Method 700 may continue with receiving the rented compartment retrieval request and determine the requested location associated with the retrieval request (block 718). For example, the renter (the same person whom made the rental request or a different person whom the renter authorizes to retrieve the product, such as a buyer of the product, hereinafter referred to as authorized renter) may desire to obtain the product within the rented compartment 441 of ARV 402. For example, the original renter may sell the contents of compartment 441 to a buyer. The buyer may be authorized by the renter to obtain the contents of the rented compartment 441 and such authorization is communicated to e.g., access system 442 in order for access system 442 to send an access code to the authorized renter. In another example, the original renter sends the retrieval request to system 300 of the fleet manager. The system 300 routes the request to the appropriate ARV 402 that contains the compartment 441 that which houses the renter's items. The request may indicate a requested arrival time of ARV 402 to a requested location to allow the authorized renter to retrieve one or more products within the rented compartment 441. In some instances, the requested location may be the current location of the device 100 of the authorized renter.

Method 700 may continue with determining the availability of the ARV and determine the fee associated with the rental period of the compartment (block 720). For example, the retrieval request may be temporarily stored within the request pool and routed to scheduler 415 to determine whether the ARV 402 could arrive at the specified retrieval location at the requested retrieval time without unacceptably impacting the current reconciled schedule of ARV 402. Scheduler 415 may determine that ARV 402 may satisfy the authorized renter's retrieval request and arrive at the specified retrieval location at the requested time so that the renter may access and retrieve from the rented compartment 441. Resultantly, scheduler 415 may confirm the retrieval request and may send a retrieval request confirmation to the appropriate retrieval requesting device 100 via text, native application, email, or the like. Scheduling system 445 may determine the rental fee of the rental compartment based upon the anticipated time period the compartment was rented. For example, the system 445 may determine the time period between when the access system 442 secured the rented compartment to the approximate time that the ARV is anticipated to arrive at the retrieval location. This anticipated rental fee may be subsequently changed to reflect a more accurate time period to account for delays, or the like.

Method 700 may continue with sending the retrieval requester the determined rental fee and the anticipated ARV arrival time at the retrieval location (block 722). For example, server 300 of the fleet manager, system 200, or the like, may send and charge the rental fee to the original renter, via SMS, email, or by a native application upon the original renter's device 100. Further, server 300 of the fleet manager system 200, or the like, may send and charge the purchase fee to the buyer, if applicable, via SMS, email, or by a native application upon the buyer's device 100. Similarly, server 300 of the fleet manager, system 200, or the like, may send and charge the rental fee, or portion thereof, to the applicable authorized renters, via SMS, email, or by a native application upon the appropriate authorized renter's device 100. Similarly, server 300 of the fleet manager, system 200, or the like, may send the anticipated arrival time to the applicable authorized renter's device 100 that is to retrieve the product, via SMS, email, or by a native application. In turn, method 700 may continue with the retrieval requestor receiving the anticipated ARV arrival time at the retrieval location (block 724). For example, the authorized renter receives upon their device 100 from server 300 of the fleet manager, system 200, or the like, the anticipated arrival time to the to the retrieval location, via SMS, email, or by a native application upon the authorized renter's device 100.

Method 700 may continue with sending the retrieval requestor a code to access the secured compartment (block 726). For example, a code, such as a PIN randomly generated by e.g. system 300, 400a, or the like, may be sent to the retrieval requesting device 100 via SMS, email, or by a native application upon the authorized renter's device 100. Alternatively, the code may generated and sent to access system if the location of the retrieval requester's device 100 is in proximate location to ARV 402. In other words, the authorized renter merely being next to ARV 402 may cause the code to be routed to access system 422 which may open the appropriate door.

Method 700 may continue with receiving or confirming fee rental fee payment, opening the door of the compartment utilizing the access key, and providing the contents of the opened compartment (block 728). For example, upon arrival of ARV 402 at the retrieval location or reconciled updated retrieval location, the authorized renter enters the code into requesting device 100 upon display 152. The authorized renter may further confirm any applicable rental payments of compartment 441, may confirm product payment for the purchase of the products contained within compartment 441, or the like. The code may be routed to access system 442 which may confirm the code is correct and may unlock the door of compartment 441 or otherwise allow access to the securable inner portion of compartment 441. After the authorized renter retrieves the product from the rented compartment, the door of compartment 441 may be closed and locked by access system 442.

Method 700 may continue with receiving a compartment security pass notification (block 730). For example, the security system 443 may confirm whether the product has been removed from the compartment and whether any new items have been placed into compartment.

Method 700 may continue with providing subsequent ride source tasks or product delivery tasks according to the reconciled schedule (block 732). For example, upon the retrieval of products from compartment 441, compartment scheduling system 445 may add compartment 441 to the queue of available compartments that are currently available for product delivery or available for compartment rental. In this way, the ARV 402 accomplishes the product fulfillment and ride source request and is then able to provide others ride source rides and/or product deliveries. Method 700 may end at block 732.

Figure 14:
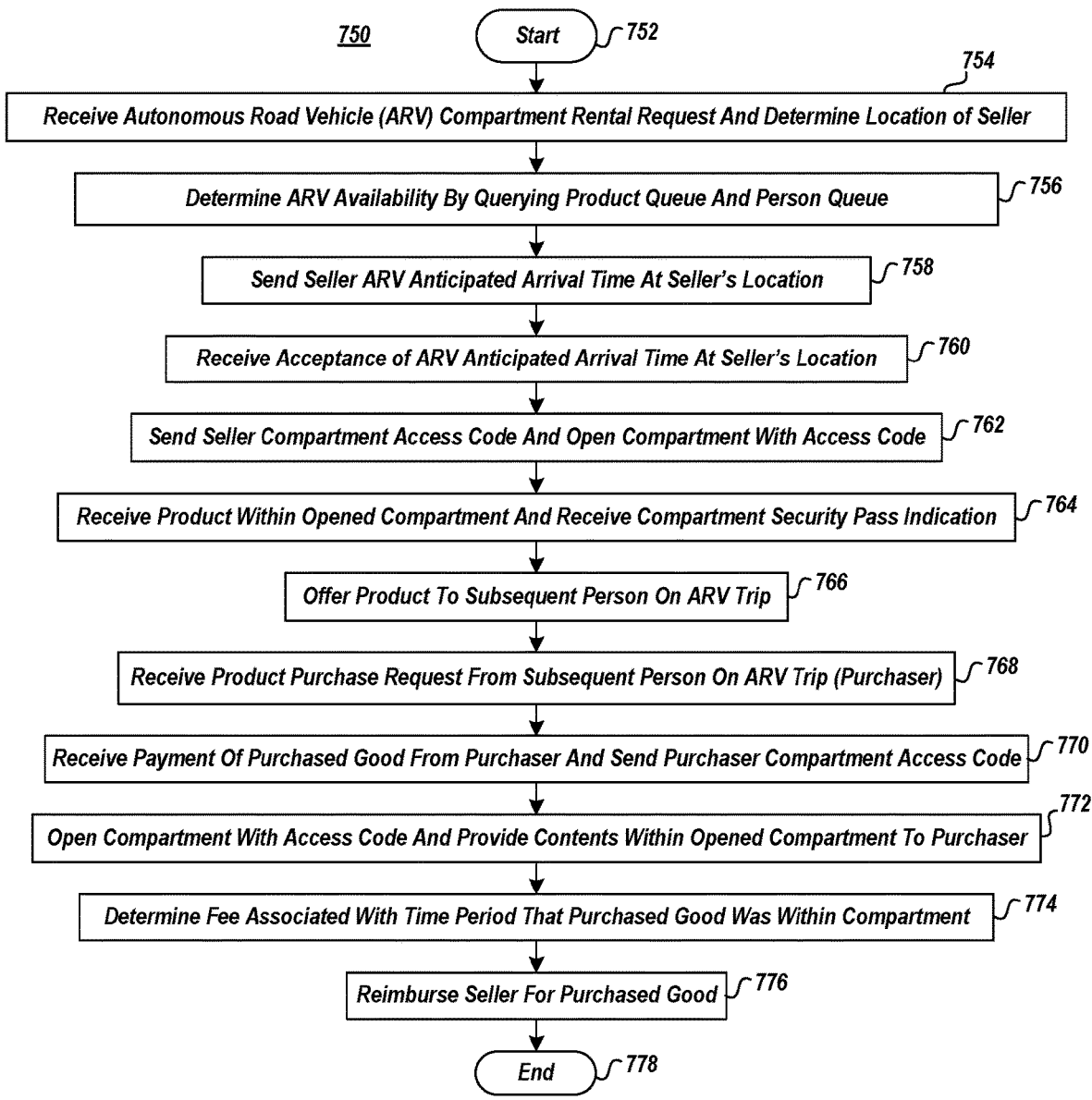
FIG. 14 illustrates a method for product retention and sale within an autonomous ride source and delivery vehicle, according to one or more embodiments.

FIG. 14 illustrates a method 750 for product retention and sale within ARV 402, according to one or more embodiments. Method 700 may be implemented by systems 100, 200, and/or 300, in conjunction with platform 400, to receive a product from a seller that is subsequently purchased and provided to a ride source person from a compartment 441 of ARV 402. In method 750, the compartment 441 may serve as a temporary compartment where a product or other item from a ride source seller is housed within the compartment 441 and purchased by a subsequent ride source buyer.

Method 750 begins at block 752 and continues with receiving an ARV compartment reservation request and determining a requested pickup location associated with the reservation request (block 754). For example, a product seller sends a request from his or her device 100 for a compartment within ARV 402 as a temporary compartment. The request may indicate a requested arrival time of ARV 402 to a pickup location to allow the seller to place one or more products within one or more compartments of ARV 402. In some instances, the requested location may be the current location of the seller's device 100. The seller may be the ride sourcing person presently being given a ride by ARV 402, a person that will be offered a ride by ARV 402 in the immediate or non-immediate future, or a person not presently associated with ARV 402. The request may be temporarily stored within the request pool maintained by e.g., server 300 of the manager of the fleet of ARVs 402, routed to compartment scheduling system 445 of platform 400 if compartment scheduling system 445 indicates that there is an open compartment or a there is a compartment scheduled to be open by the time of arrival at the pickup location.

Method 750 may continue with determining ARV availability by querying the product scheduling queue and the person scheduling queue (block 756). For example, the request may be routed to scheduler 415 of platform 400 to determine whether the ARV 402 could arrive at the specified pickup location at the requested time without unacceptably impacting the current reconciled schedule (i.e. product delivery schedule and person ride schedule) of ARV 402. Compartment scheduling system 445 may determine that compartment 441 is available and scheduler 415 may determine that ARV 402 may satisfy the seller's request and arrive at the specified location so that the seller may access the available compartment 441.

Method 750 may continue with sending an anticipated arrival time of the ARV to the seller's requested location (block 758). For example, scheduler 415 may confirm the access request and may send an anticipated arrival confirmation to device 100 of the seller via text, native application, email, or the like. Method 750 may continue with device 100 of the seller receiving the anticipated arrival time of the ARV to the requested location (block 760).

Method 750 may continue with sending a compartment access code to the seller and the seller opening the available compartment utilizing the access code (block 762). For example, a PIN randomly generated by e.g. system 300 of the manager of the ARV fleet, may be sent to device 100 of the seller. Upon arrival of ARV 402 at the requested location the seller enters the code into device his or her device 100, enters the code upon a keypad of ARV 402, or the like. Alternatively, upon the applicable device 100 (e.g., the device that made the access request, or the like) being in proximate location to the ARV 402 the access code may be sent from e.g., system 300 of the manager of the ARV fleet to access system 422 of ARV 402. The code may be received by the access system 442. The access system 442 may confirm the code is correct and may unlock the door of compartment 441 or otherwise allow access to the securable inner portion of compartment 441.

Method 750 may continue with receiving the product or other item within the accessible compartment 441 and receiving a security pass indication (block 764). For example, after the seller places the product into the rented compartment 441, the seller may again enter the code into the keypad, and upon code confirmation, locks the compartment door. Alternatively, the access system 442 may close and lock the door after a predetermined time period, or may close and lock the door upon the detection of the product. Security system 443 may further confirm whether the product within compartment 441 poses an unacceptable security threat prior to further action by ARV 402. For example, the imaging system or olfactory system may determine that the product is not unacceptably hazardous.

Upon the utilization of compartment 441, compartment scheduling system 445 may remove compartment 441 from the queue of available compartments that are currently available for product delivery or available for compartment rental within ARV 402.

Method 750 may continue with receiving product data from the seller (block 765). For example, the seller may scan a code associated with the product. The purchase module 450 may identify the good from the scan and may obtain a product description listing from e.g. server 300 of the fleet manager, server 300 of a retailer, server 300 of the seller, or the like. In another example, the seller may submit a product description from his or her device 100 to server 300 of the fleet manager. The server 300 of the fleet manager may then route the product description to the purchase module 450 of the ARV 402 that received the product from the seller.

Method 750 may continue with ARV 402 giving one or more subsequent persons a ride within ARV 402 and offering the product for sale upon system 200 (block 766). For example, a product listing is displayed upon screen 252 of system 200 that is associated with the person station 476 in which the one or more subsequent persons are contained.

Method 750 may continue with receiving a product purchase indication from the one or more subsequent persons a ride within ARV 402 (block 768). For example, one of the subsequent ride source person touches screen 252 upon a purchase GUI object therein displayed, and a purchase good indication is received by purchase module 450, one of the subsequent ride source person touches screen 151 upon a purchase GUI object therein displayed, and a purchase good indication is received by purchase module 450.

Method 750 may continue with receiving product purchase payment from the purchaser (block 768). For example, for example a credit card associated with the native application of the fleet manager upon the purchases device 100 is charged, purchase module 450 receives credit card information or cash, or the like, associated with the purchaser interacting with system 200.

Method 750 may continue with opening the compartment 411 that contains the purchased product and providing the contents of the compartment to the purchaser (block 772). For example, a PIN randomly generated by e.g. system 300 of the manager of the ARV fleet, may be sent to device 100 of the purchaser. The purchaser enters the code into device his or her device 100, enters the code upon a keypad of ARV 402, or the like. Alternatively, access system 422 of ARV 402 may resulting provide access to the compartment 441 upon payment confirmation. For example, the compartment may be a compartment inside the ARV that which the purchase may access. The access system 442 may resultantly unlock the door of compartment 441 or otherwise allow access to the securable inner portion of compartment 441.

Method 750 may continue with determining the time period that the purchased product was contained within the compartment (block 774). For example, the time period between the time product 441 being placed into the compartment 441 and the time the product was removed by the buyer is determined by scheduling system 445. A fee may be determined from the determined time period and charged to the seller.

Method 750 may continue with reimbursing the seller for the purchased product (block 776). For example, server 300 of the fleet manager may send the purchase price of the product less the fee associated with the determined time period to the product seller. Method 750 may end at block 778.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments presented herein may be devised without departing from the basic scope thereof, and the scope thereof is determined by the claims that follow.

What is claimed is:

1. A computer program product comprising a computer readable storage medium having program instructions embodied therewith, the program instructions when read by a processor of an autonomous road vehicle (ARV), the ARV containing a ride sourcing and delivery platform which comprises a compartment access system, a compartment security system, and a facial recognition module, cause the processor to:

receive, via one or more networks, an ARV compartment rental request from a mobile computing system of a seller of a product, the rental request comprising a request to rent any ARV compartment of the ARV to house the product until the product is purchased and a requested arrival time of the ARV to a product fulfilment location;

determine if an ARV compartment is scheduled to be unoccupied (available compartment) at the requested arrival time of the ARV;

query a reconciled ARV schedule comprising preexisting ride source tasks and preexisting product delivery tasks;

send an acceptance notification of the ARV compartment rental request comprising a compartment access code (CAC) to the mobile computing system of the seller and add an associated ARV compartment rental task to the reconciled ARV schedule, if the ARV compartment rental request does not impinge upon any of the preexisting ride source tasks and any of the preexisting product delivery tasks;

send an instruction, via a communication system of the ARV, to a compartment access system comprising the available compartment, a door to the available compartment, and a CAC to unlock a door of the available compartment at the requested location upon verification of a first entered CAC received by the compartment access system from the seller is the CAC:

receive, via the communication system of the ARV from a compartment security system comprising an imaging subsystem and an olfactory subsystem, an indication that the product has been placed within the available compartment of the ARV;

receive product information of the product by receiving a code scan of a code associated with the product from a code scanner via the communication system of the ARY, identifying the product from the code scan, and obtaining product information of the identified product from a server connected to the processor via the one or more networks;

receive an indication, via the communication system of the ARY from the compartment access system, that the door of the available compartment has been closed and locked (secured compartment) by the lock, upon the compartment access system verifying a second entered CAC from the seller is the CAC;

subsequently determine a route to satisfy a ride source request for the ARV to provide a ride to a ride source person;

receive, via the communication system of the ARV, from a facial recognition module comprising an image capture device, an indication of a perceived mood determined from a facial image capture of the ride source person that is being given a ride by the ARV;

based upon the perceived mood, subsequently display a graphic user interface (GUI) upon a display of an infotainment system of a person station connected to the processor of the ARV, comprising an offer for sale advertisement of the product within the secured compartment that includes the product information;

subsequent to displaying the GUI, receive a purchase confirmation from the GUI that indicates the product within the secured compartment has been purchased by the ride source person (buyer);

subsequent to receiving the purchase confirmation, instruct the security system via the communication system of the ARV to allow access to the secured compartment to the buyer and receive an indication from the security system via the communication system of the ARV that that the product has been removed therefrom;

subsequent to allowing access to the secured compartment and determining the product has been removed therefrom, determine a rental time period the product was contained within the secured compartment; and subsequent determining the rental time period, reimburse the seller a purchase price of the product less a fee associated with the rental time period by sending a reimbursement to the mobile computing system of the seller via the one or more networks.

2. The computer program product of claim 1, wherein the program instructions are readable by the processor to further cause the processor to:

receive payment of the purchase price of the product from the buyer.

3. The computer program product of claim 1, wherein the ARV provides a ride to an intervening person after receipt of the indication that the product has been placed within the available compartment of the ARV and that the available compartment of the ARV has been subsequently secured prior to providing the GUI.

4. The computer program product of claim 1, wherein the program instructions are readable by the processor to further cause the processor to:

receive payment for the ride source ride provided by the ARV from the buyer.

5. The computer program product of claim 1, wherein the program instructions are readable by the processor to further cause the processor to:

upon determining the compartment is scheduled to be available at the requested arrival time of the ARV, remove the compartment from a compartment queue stored within the computer readable storage medium of the ARV that indicates which of a plurality of compartments of the ARV are available for compartment rental or for ARV product delivery tasks.

6. The computer program product of claim 1, wherein the program instructions that cause the processor to receive the ARV compartment rental request from the seller, further cause the processor to: receive an ARV ride source request for the ARV from the seller to provide a ride to the seller.

* * * * *